US009732978B2

United States Patent
Sugiyama et al.

(10) Patent No.: US 9,732,978 B2
(45) Date of Patent: Aug. 15, 2017

(54) CONTROL METHOD FOR INFORMATION TERMINAL DEVICE AND NON-TRANSITORY COMPUTER READABLE RECORDING MEDIUM

(71) Applicant: Panasonic Intellectual Property Corporation of America, Torrance, CA (US)

(72) Inventors: Masashi Sugiyama, Shiga (JP); Taiji Sasaki, Osaka (JP); Yoichi Nishida, Osaka (JP); Shunji Harada, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 507 days.

(21) Appl. No.: 14/514,650

(22) Filed: Oct. 15, 2014

(65) Prior Publication Data

US 2015/0112489 A1 Apr. 23, 2015

(30) Foreign Application Priority Data

Oct. 22, 2013 (JP) ................................ 2013-219158

(51) Int. Cl.
| | |
|---|---|
| G01M 1/38 | (2006.01) |
| F24F 11/00 | (2006.01) |
| G05B 15/02 | (2006.01) |
| H04L 29/08 | (2006.01) |
| G05D 23/19 | (2006.01) |

(52) U.S. Cl.
CPC ........ *F24F 11/006* (2013.01); *F24F 11/0086* (2013.01); *G05B 15/02* (2013.01);
(Continued)

(58) Field of Classification Search
CPC .................................................. F24F 11/006
(Continued)

(56) References Cited

U.S. PATENT DOCUMENTS 5,176,006 A * 1/1993 Ikawa ...................... F24F 11/00
165/265
5,372,015 A * 12/1994 Suzuki ................ F24F 11/0009
236/78 D (Continued)

FOREIGN PATENT DOCUMENTS

JP 2001-343477 12/2001

OTHER PUBLICATIONS

Hutzel, William J. "A remotely accessed HVAC laboratory for distance education." International Journal of Engineering Education 18.6 (2002): pp. 711-716.*

(Continued)

*Primary Examiner* — Satish Rampuria
(74) *Attorney, Agent, or Firm* — Greenblum & Bernstein, P.L.C.

(57) ABSTRACT

There is provided a control method for an information terminal device having a display and controlling an air conditioner over a network. The control method makes the information terminal device perform processing including: displaying a temperature setting screen where an air conditioner temperature is settable for each of a plurality of time periods; calculating a first time period preset temperature using a first preset temperature at a boundary time and a second preset temperature at a go-to-bed time; calculating a second time period preset temperature using the first preset temperature and a third preset temperature at a wake-up time; displaying the first time period preset temperature and second time period preset temperature; and outputting to the network a control command corresponding to the first preset temperature and second preset temperature when the first time period preset temperature and second time period preset temperature have been fixed.

16 Claims, 27 Drawing Sheets

(52) U.S. Cl.
CPC ..... *G05D 23/1904* (2013.01); *G05D 23/1905* (2013.01); *H04L 67/10* (2013.01); *F24F 2011/0071* (2013.01); *F24F 2011/0091* (2013.01)

(58) Field of Classification Search
USPC .................................................. 700/275–306
See application file for complete search history.

(56) References Cited

U.S. PATENT DOCUMENTS

| | | | |
|---|---|---|---|
| 6,438,462 B1* | 8/2002 | Hanf ...................... | G06F 1/3203 340/693.4 |
| 2002/0124584 A1* | 9/2002 | Sumida ................ | F24F 11/0012 62/202 |
| 2014/0142763 A1* | 5/2014 | Hutchinson .......... | F24F 11/0086 700/276 |

OTHER PUBLICATIONS

Agarwal, Yuvraj, et al. "Duty-cycling buildings aggressively: The next frontier in HVAC control." Information Processing in Sensor Networks (IPSN), 2011 10th International Conference on. IEEE, 2011.pp. 246-257.*

Sharma, Anshuman. Design of wireless sensor networks for building management systems. Diss. Department of Electrical Engineering and Computer Sciences, University of California at Berkeley, 2003. pp. 1-51.*

* cited by examiner

FIG. 3

| OPERATION NAME | DESCRIPTION | OPERATION IMAGE |
|---|---|---|
| TOUCH | TOUCH SCREEN WITH FINGER | 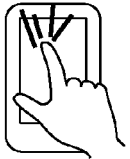 |
| FLICK | FLICK FINGER ON SCREEN | 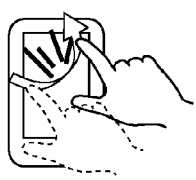 |
| TAP | TAP SCREEN WITH FINGER | 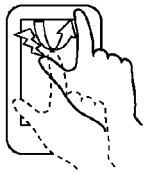 |
| DRAG | SLIDE AND MOVE FINGER | 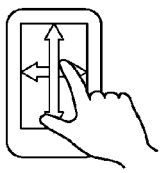 |
| SLIDE | TRACE SCREEN WITH FINGER | 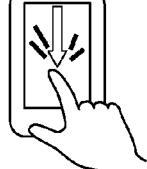 |
| PINCH-IN | PLACE TWO FINGERS ON SCREEN, FINGERS SPREAD WIDE APART, THEREAFTER BRING FINGERS CLOSER TOGETHER |  |
| PINCH-OUT | PLACE TWO FINGERS ON SCREEN, FINGERS CLOSE TOGETHER, THEREAFTER SPREAD FINGERS APART | 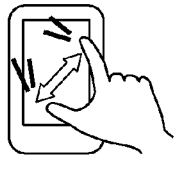 |

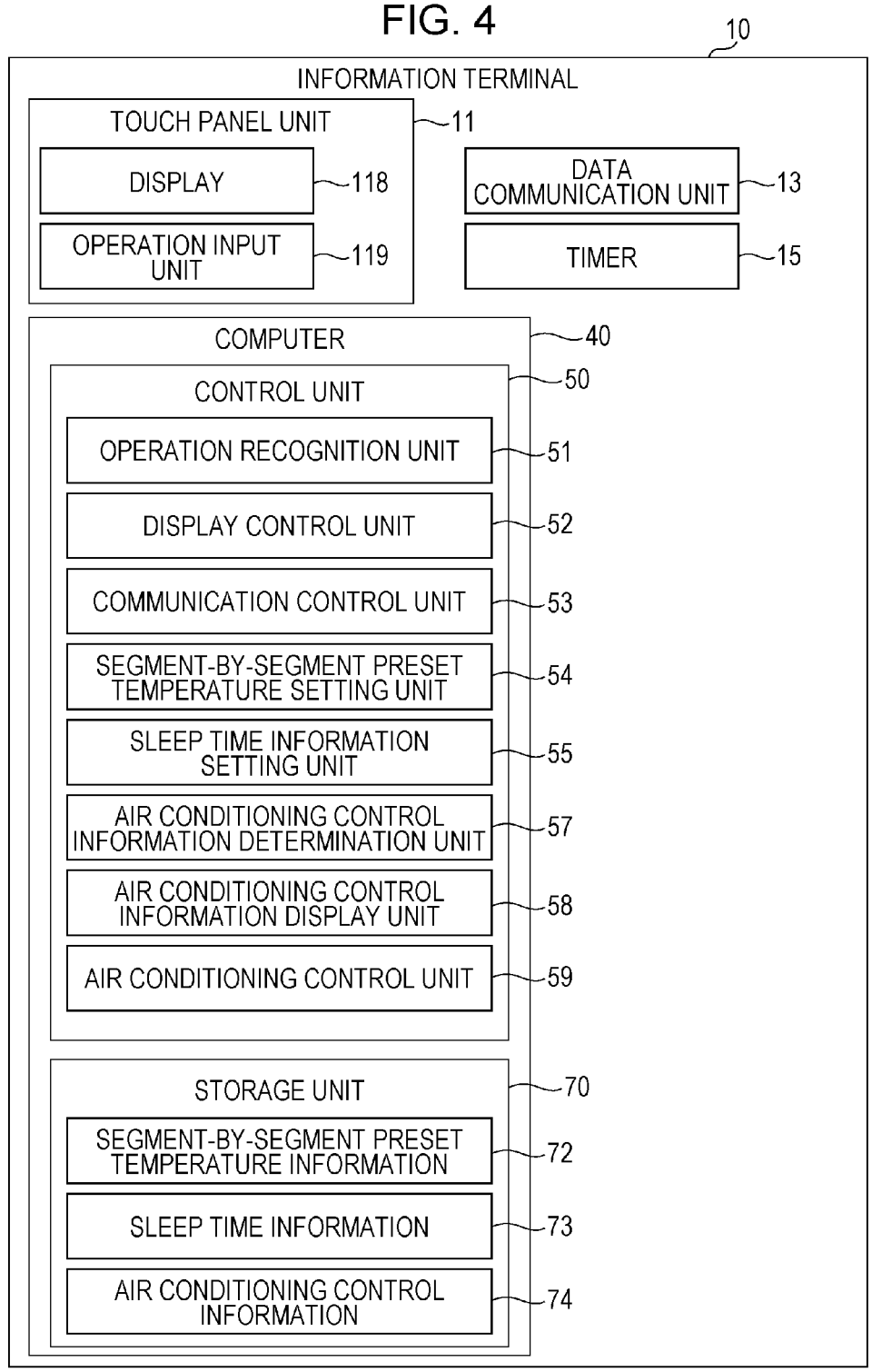

FIG. 16

| | PRESET TIME |
|---|---|
| GO-TO-BED TIME | 23:00 |
| BOUNDARY TIME | 4:00 |
| WAKE-UP TIME | 7:15 |

SLEEP TIME INFORMATION

FIG. 18

AIR CONDITIONING CONTROL INFORMATION 74, 745

FIRST TIME PERIOD PRESET TEMPERATURE INFORMATION

| PRESET TIME | PRESET TEMPERATURE |
|---|---|
| 23:00 | 24 |
| 0:15 | 25 |
| 1:30 | 26 |
| 2:45 | 27 |
| 4:00 | 28 |

SECOND TIME PERIOD PRESET TEMPERATURE INFORMATION 746

| PRESET TIME | PRESET TEMPERATURE |
|---|---|
| 4:00 | 28 |
| 5:05 | 27 |
| 6:10 | 26 |
| 7:15 | 25 |

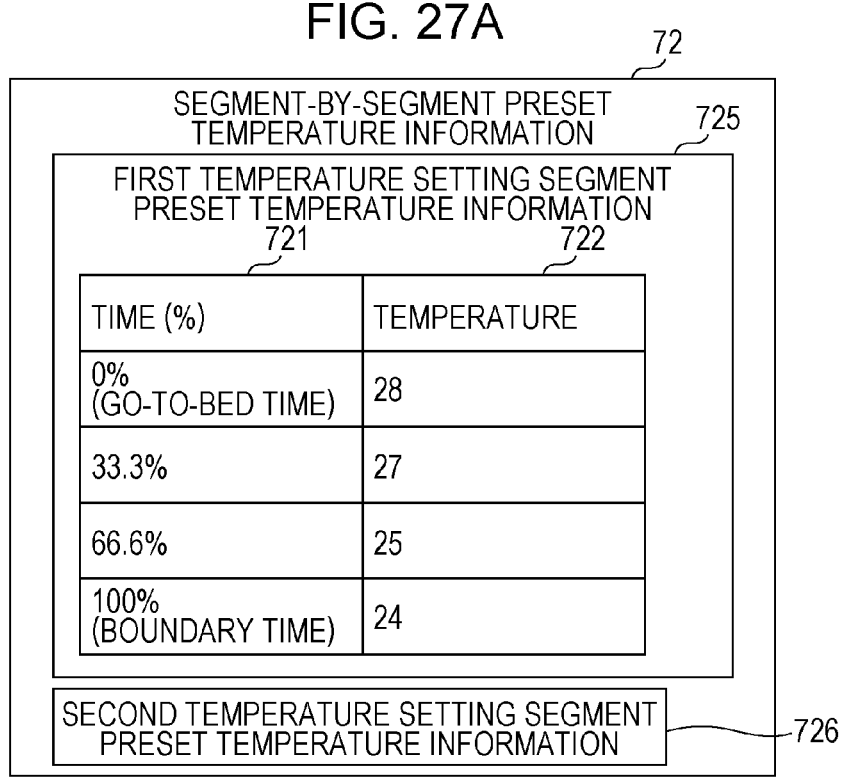
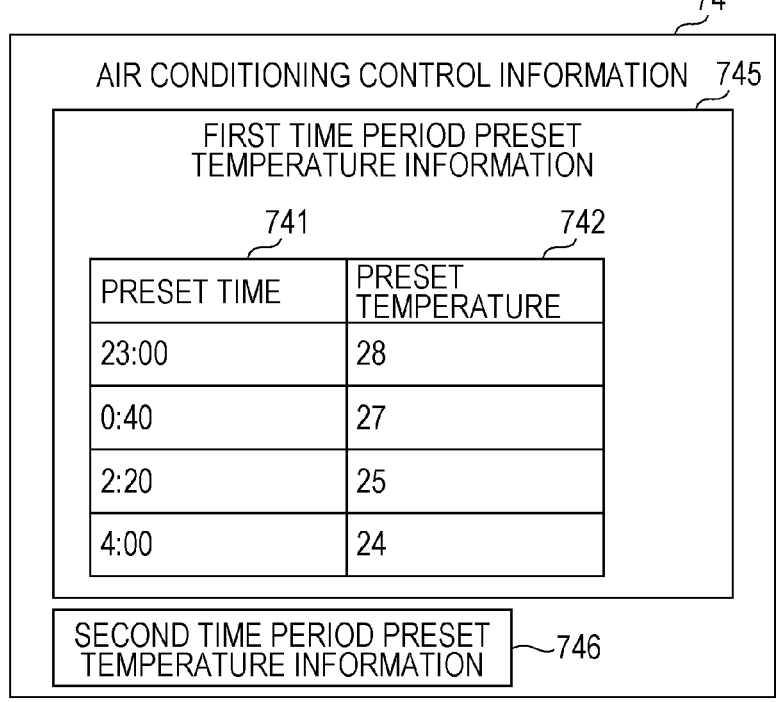

CONTROL METHOD FOR INFORMATION TERMINAL DEVICE AND NON-TRANSITORY COMPUTER READABLE RECORDING MEDIUM

BACKGROUND OF THE INVENTION

1. Field of the Invention

The present disclosure relates to a control method for an information terminal device that controls an air conditioner over a network and to a non-transitory computer readable recording medium.

2. Description of the Related Art

Air conditioners are usually used in order to control room temperature during the daytime and to provide a comfortable sleep environment during the night.

For example, in an air conditioning system disclosed in Japanese Unexamined Patent Application Publication No. 2001-343477, it is suggested to perform a temperature setting of an air conditioner for each of a plurality of time periods using an information terminal.

However, further improvement has been needed for a technique disclosed in Japanese Unexamined Patent Application Publication No. 2001-343477.

SUMMARY OF THE INVENTION

In one general aspect, the techniques disclosed here feature a control method for an information terminal device that has a display and controls an air conditioner over a network. The control method makes the information terminal device perform processing including: displaying on the display a temperature setting screen in which a temperature of the air conditioner is settable for each of a plurality of time periods, the temperature setting screen including a first temperature setting segment used to set a temperature of the air conditioner in a first time period and a second temperature setting segment used to set a temperature of the air conditioner in a second time period, the first time period being a time period from a go-to-bed time of a user using the air conditioner until a first time that is a time between the go-to-bed time and a wake-up time of the user, the second time period being a time period from the first time until the wake-up time; calculating a first time period preset temperature of the air conditioner which changes in the first time period by using a first preset temperature that is a temperature of the air conditioner at the first time and that has been set in the temperature setting screen and a second preset temperature that is a temperature of the air conditioner at the go-to-bed time and that has been set in the temperature setting screen; calculating a second time period preset temperature of the air conditioner which changes in the second time period by using the first preset temperature and a third preset temperature that is a temperature of the air conditioner at the wake-up time and that has been set in the temperature setting screen; displaying in the first temperature setting segment the first time period preset temperature that has been calculated; displaying in the second temperature setting segment the second time period preset temperature that has been calculated; and outputting to the network a control command that corresponds to the first preset temperature and the second preset temperature in a case where the first time period preset temperature and the second time period preset temperature have been fixed.

According to the aspect of the present disclosure, further improvement can be achieved.

The above-described general aspect may be implemented using a system, a method, and a computer program, and any combination of systems, methods, and computer programs.

BRIEF DESCRIPTION OF THE DRAWINGS

FIG. 3 is a diagram describing basic operations of the information terminal using fingers in the first embodiment.

FIG. 4 is a diagram illustrating a configuration of the information terminal in the first embodiment.

FIG. 16 is a diagram illustrating a configuration of the sleep time information in the first embodiment.

FIG. 18 is a diagram illustrating a configuration of the air conditioning control information in the first embodiment.

FIG. 27A is a diagram illustrating an example of the segment-by-segment preset temperature information in the tenth embodiment.

FIG. 27B is a diagram illustrating an example of the air conditioning control information in the tenth embodiment.

DESCRIPTION OF THE PREFERRED EMBODIMENTS

Background Findings Related to the Present Invention

During the daytime, a comfortable indoor environment is realized by a user controlling the temperature of an air conditioner.

On the other hand, during the night, a user cannot control the temperature of an air conditioner because the user is sleeping. Therefore, an air conditioner itself is required to automatically control the temperature. Especially, the temperature is high during a summer night and people often cannot sleep well. Accordingly, it has been desired that an air conditioning system provide a comfortable indoor environment.

Japanese Unexamined Patent Application Publication No. 2001-343477 discloses a technique in which a user sets in advance the temperature of an air conditioner during the night for each time period so that the air conditioner automatically performs temperature control even if the user is sleeping.

The inventor has found that problems described below occur in the technique disclosed in Japanese Unexamined Patent Application Publication No. 2001-343477.

Figure 1:
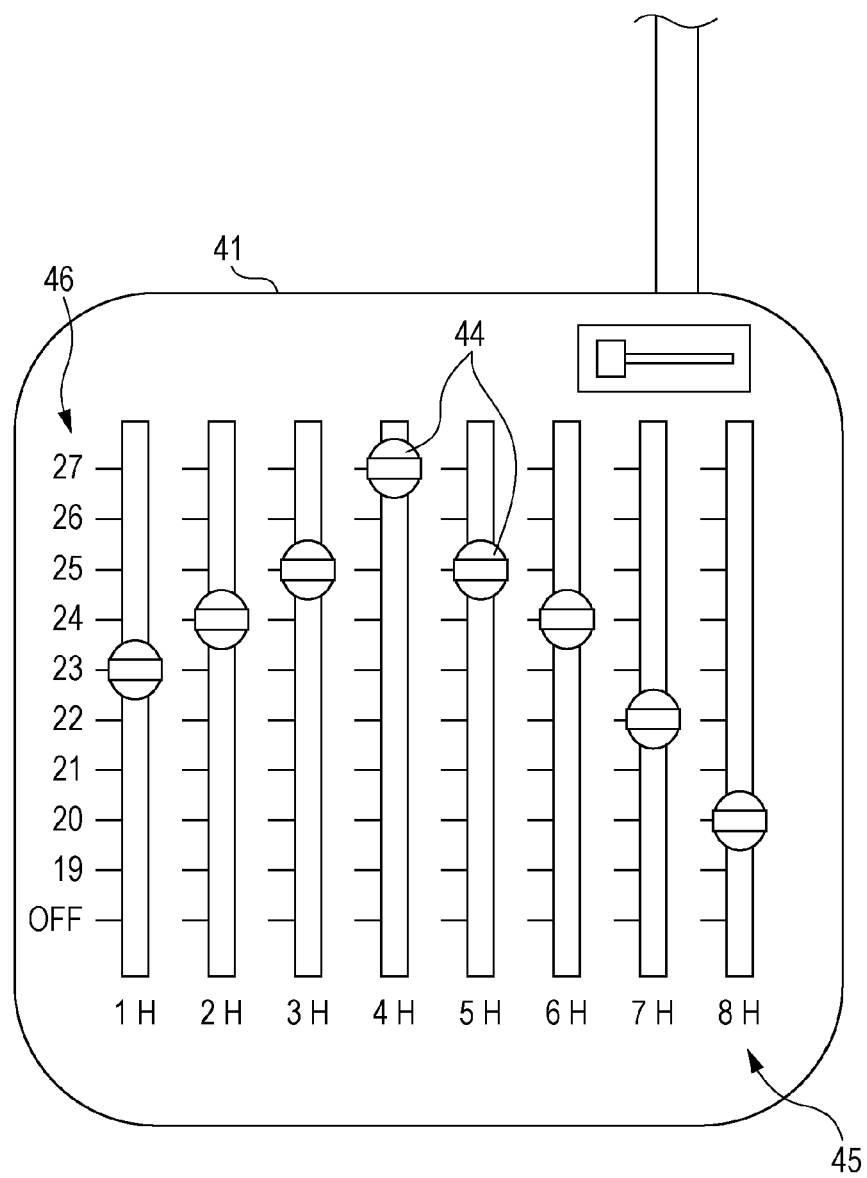
FIG. 1 is a diagram illustrating a configuration of an information terminal according to the related art.

As illustrated in FIG. 1, an information terminal 41 of an air conditioning system disclosed in Japanese Unexamined Patent Application Publication No. 2001-343477 has a first time-period scale 45 and a first temperature scale 46. A user can set the temperature of the air conditioner for each time period by sliding a first tab member 44 on each scale upward or downward.

However, with the information terminal 41 in FIG. 1, the temperature of the air conditioner can be set only on an hourly basis from a time when air conditioning is started. Accordingly, it is troublesome to set the temperature of the air conditioner in accordance with the go-to-bed time of a user (a time when air conditioning is started) and the wake-up time of the user (a time when air conditioning is stopped), the go-to-bed time and the wake-up time varying daily, which has been a problem.

According to the circadian rhythm, which is a physiological characteristic of human beings, the body temperature of human beings during sleep has a pattern such that the body temperature gradually decreases until about 4 a.m. and thereafter increases. Therefore, it is desirable that the temperature of an air conditioner be set in accordance with the circadian rhythm.

However, with the information terminal 41 illustrated in FIG. 1, the temperature of the air conditioner cannot be set for each time of day and it is troublesome for a user to set the temperature in accordance with the circadian rhythm, which has also been a problem.

Accordingly, the inventor has studied measures for improvement as follows.

An aspect of the present disclosure provides a control method for an information terminal device that has a display and controls an air conditioner over a network. The control method makes the information terminal device perform processing including: displaying on the display a temperature setting screen in which a temperature of the air conditioner is settable for each of a plurality of time periods, the temperature setting screen including a first temperature setting segment used to set a temperature of the air conditioner in a first time period and a second temperature setting segment used to set a temperature of the air conditioner in a second time period, the first time period being a time period from a go-to-bed time of a user using the air conditioner until a first time that is a time between the go-to-bed time and a wake-up time of the user, the second time period being a time period from the first time until the wake-up time; calculating a first time period preset temperature of the air conditioner which changes in the first time period by using a first preset temperature that is a temperature of the air conditioner at the first time and that has been set in the temperature setting screen and a second preset temperature that is a temperature of the air conditioner at the go-to-bed time and that has been set in the temperature setting screen; calculating a second time period preset temperature of the air conditioner which changes in the second time period by using the first preset temperature and a third preset temperature that is a temperature of the air conditioner at the wake-up time and that has been set in the temperature setting screen; displaying in the first temperature setting segment the calculated first time period preset temperature; displaying in the second temperature setting segment the calculated second time period preset temperature that has been calculated; and outputting to the network a first control command that corresponds to the first preset temperature and a second control command that corresponds to the second preset temperature in a case where the calculated first time period preset temperature have been fixed as the first time period preset temperature and the calculated second time period preset temperature have been fixed as the second time period preset temperature have.

In the above-described aspect, the calculated first time period preset temperature may be represented by a first line that connects a point corresponding to the second preset temperature and a point corresponding to the first preset temperature, and the calculated second time period preset temperature that has been calculated may be represented by a second line that connects a point corresponding to the third preset temperature and the point corresponding to the first preset temperature.

In the above-described aspect, the display may be a touch panel display, the first line may be changeable to a curve by an operation performed by a user who has touched the first line, and the second line may be changeable to a curve by an operation performed by the user who has touched the second line.

In the above-described aspect, the first line may be a straight line and the second line may be a straight line.

In the above-described aspect, the calculated first time period preset temperature may be represented using a graph having a vertical axis that represents a preset temperature of the air conditioner and a horizontal axis that represents time, and the calculated second time period preset temperature may be represented using a graph having a vertical axis that represents a preset temperature of the air conditioner and a horizontal axis that represents time.

In the above-described aspect, the first control command and the second control command may be outputted to the network at a predetermined timing.

In the above-described aspect, the first time may be a time between 3:30 a.m. and 4:30 a.m.

In the above-described aspect, the processing may further include displaying on the display a time setting screen for setting a going-out time that is a time when the user goes out, separately from the temperature setting screen, and the first time may be a time obtained by subtracting a first predetermined time from the going-out time that has been set in the time setting screen.

In the above-described aspect, the first predetermined time may be a time having a range of two hours to three hours.

In the above-described aspect, the information terminal device may be connected to a system that manages position information indicating a position of the information terminal device, may receive, from the system, information indicating that the information terminal device is located away from a house of a user of the information terminal device by a predetermined distance for the first time after the wake-up time, and may set a time obtained by subtracting a second predetermined time from a time when receiving the information as the first time.

In the above-described aspect, the second predetermined time may be a time having a range of two hours to three hours.

In the above-described aspect, the information terminal device may include a thermometer, and may set a time when a body temperature of the user measured by the thermometer bottoms out as the first time.

In the above-described aspect, the go-to-bed time may be a time when the calculated first time period preset temperature have been fixed as the first time period preset temperature and the calculated second time period preset temperature have been fixed as the second time period preset temperature.

In the above-described aspect, the information terminal device may include an illuminance sensor, and may set a time when the illuminance sensor detected turn-off of a light in space where the user sleeps as the go-to-bed time.

In the above-described aspect, the information terminal device may include an alarm, and may set a time which has been set by the user and at which the alarm is activated as the wake-up time.

Hereinafter, embodiments of the present disclosure will be described with reference to the drawings.

First Embodiment

Figure 2:
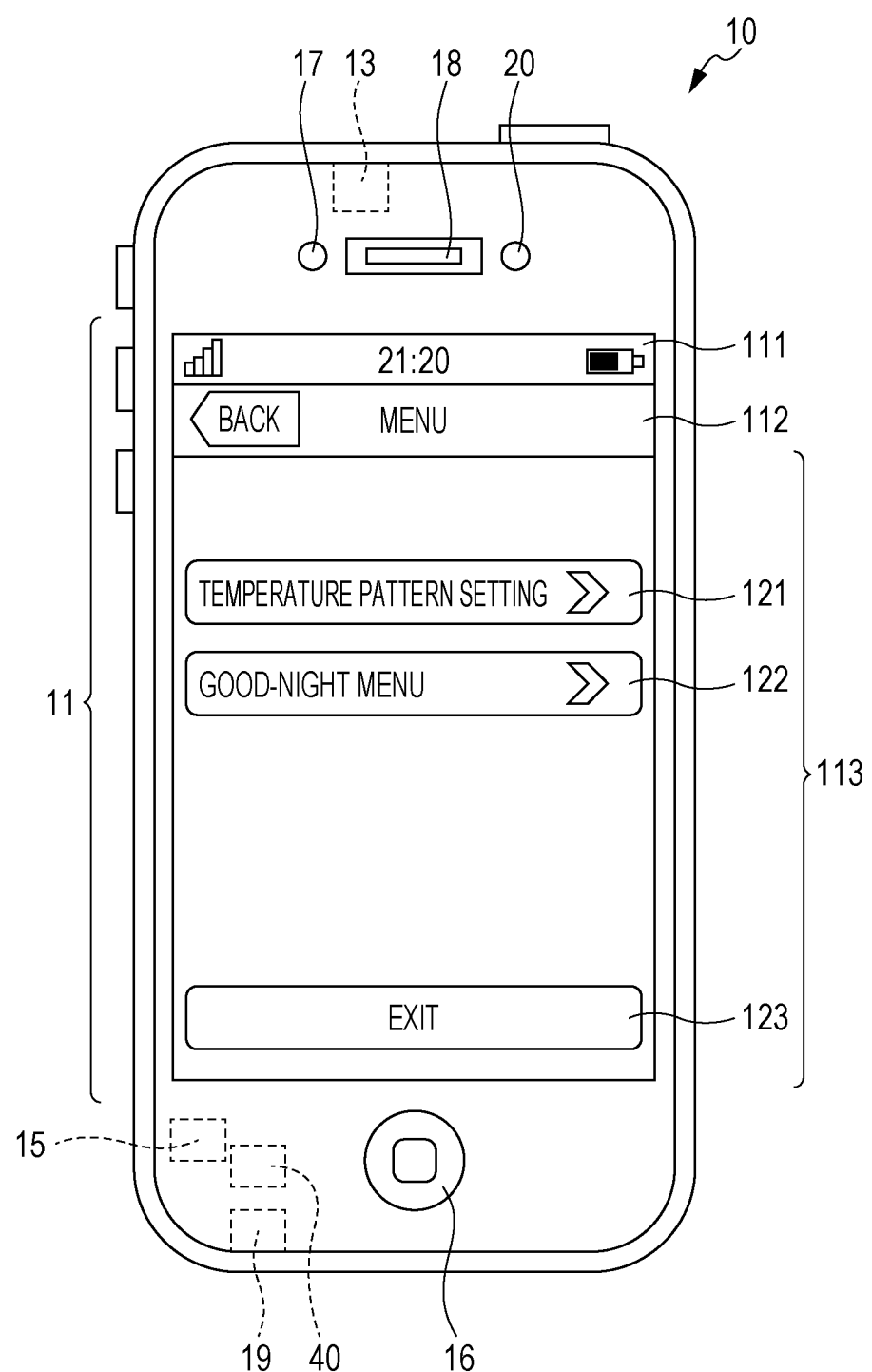
FIG. 2 is a diagram illustrating a configuration of a user interface of an information terminal in a first embodiment.

FIG. 2 illustrates a configuration of an information terminal 10 in the first embodiment.

The information terminal 10 includes a touch panel unit 11, a data communication unit 13, a timer 15 for obtaining time, and a computer 40.

In addition to those described above, the information terminal 10 may also include a home button 16 for receiving input made by a user, a camera 17 for capturing an image of surroundings, a speaker 18 that outputs sound, a microphone 19 that picks up ambient sound, an illuminance sensor 20 that senses ambient brightness, and a global positioning system (GPS) sensor (not illustrated) that obtains position information about the information terminal 10.

The touch panel unit 11 includes a display 118 (not illustrated) that displays an image or a moving picture and an operation input unit 119 (not illustrated) that receives operations from a user.

The operation input unit 119 is implemented by using a touch sensor based on an electrostatic capacitance system. An electrostatic capacitance system is a system for sensing an operation performed by a user by sensing a change in the electrostatic capacitance caused by a human body touching the panel.

Note that the operation input unit 119 may be implemented by using a device based on other systems as long as the device can receive operations performed by a user. Examples of other systems include an electromagnetic induction system, an infrared system, a surface acoustic wave system, a resistive film system, and a matrix switch system.

The display 118 is implemented by using a liquid crystal display, for example.

Note that the display 118 may be implemented by using other displays as long as the displays can display an image or a moving picture. For example, a light-emitting diode display, an organic electroluminescence (EL) display, a plasma display, or a cathode-ray tube display may be used.

The information terminal 10 is constituted by a smartphone, a mobile phone, a tablet terminal, a personal computer, or a television, for example.

Note that the information terminal 10 may be constituted by any device as long as the device includes the computer 40, the display 118, and the operation input unit 119.

The touch panel unit 11 included in the information terminal 10 integrally includes the display 118 and the operation input unit 119, however, the display 118 may be provided separately from the touch panel unit 11.

On the display 118 included in the touch panel unit 11 illustrated in FIG. 2, a status bar 111 that displays the communication status, the current time, and the like, a navigation bar 112 that displays the current setting menu and the like, and a main display section 113 are displayed as an initial display.

FIG. 3 illustrates basic operations of the information terminal 10 using fingers.

Operations performed on the touch panel unit 11 of the information terminal 10 using fingers will be described with reference to FIG. 3.

Operations using fingers include a touch operation of touching the screen with a finger, a flick operation of flicking a finger on the screen, a tap operation of tapping the screen with a finger, a drag operation of touching the screen with a finger and thereafter sliding and moving the finger, a slide operation of tracing the screen with one finger, a pinch-in operation of placing two fingers on the screen, the fingers being spread wide apart, and thereafter bringing the fingers closer together, and a pinch-out operation of placing two fingers on the screen, the fingers being close together, and thereafter spreading the fingers apart.

When any of the above-described operations is performed, the information terminal 10 that includes the touch panel unit 11 recognizes the details of the operation to thereby control an air conditioning system described below. Description will be given below while referring to the names of operations illustrated in FIG. 3.

FIG. 4 is a diagram illustrating a configuration of the information terminal 10. The information terminal 10 includes the touch panel unit 11 that provides an input/output function, the data communication unit 13 that communicates with an external network, the timer 15 that obtains time, and the computer 40.

The computer 40 includes a control unit 50 and a storage unit 70.

The control unit 50 includes an operation recognition unit 51, a display control unit 52, a communication control unit 53, a segment-by-segment preset temperature setting unit 54, a sleep time information setting unit 55, an air conditioning control information determination unit 57, an air conditioning control information display unit 58, and an air conditioning control unit 59. The operation recognition unit 51 recognizes input to the touch panel unit 11 as an operation among the operations illustrated in FIG. 3. The display control unit 52 controls display on the touch panel unit 11. The communication control unit 53 controls the data communication unit 13. The segment-by-segment preset temperature setting unit 54 displays a screen for making a user set segment-by-segment preset temperature information. The sleep time information setting unit 55 displays a screen for making a user set sleep time information. The air conditioning control information determination unit 57 determines a temperature setting of an air conditioner on the basis of the segment-by-segment preset temperature information and the sleep time information respectively set by the segment-by-segment preset temperature setting unit 54 and the sleep time information setting unit 55. The air conditioning control information display unit 58 displays information determined by the air conditioning control information determination unit 57 on the touch panel unit 11. The air conditioning control unit 59 controls an air conditioner over a network 4 (illustrated in FIG. 5) on the basis of the information determined by the air conditioning control information determination unit 57.

The control unit 50 is implemented by using a central processing unit (CPU) that operates in accordance with a program.

The storage unit 70 includes segment-by-segment preset temperature information 72, sleep time information 73, and air conditioning control information 74 about an air conditioner.

The storage unit 70 is constituted by a medium that can store information. The storage unit 70 is constituted by using a random access memory (RAM) or a read-only memory (ROM).

As the storage unit 70, other media may be used as long as the media can store information. For example, a semiconductor storage device, such as a Secure Digital (SD) card (registered trademark) or a solid state device (SSD), a hard disk, or a flexible disk may be used.

Figure 5:
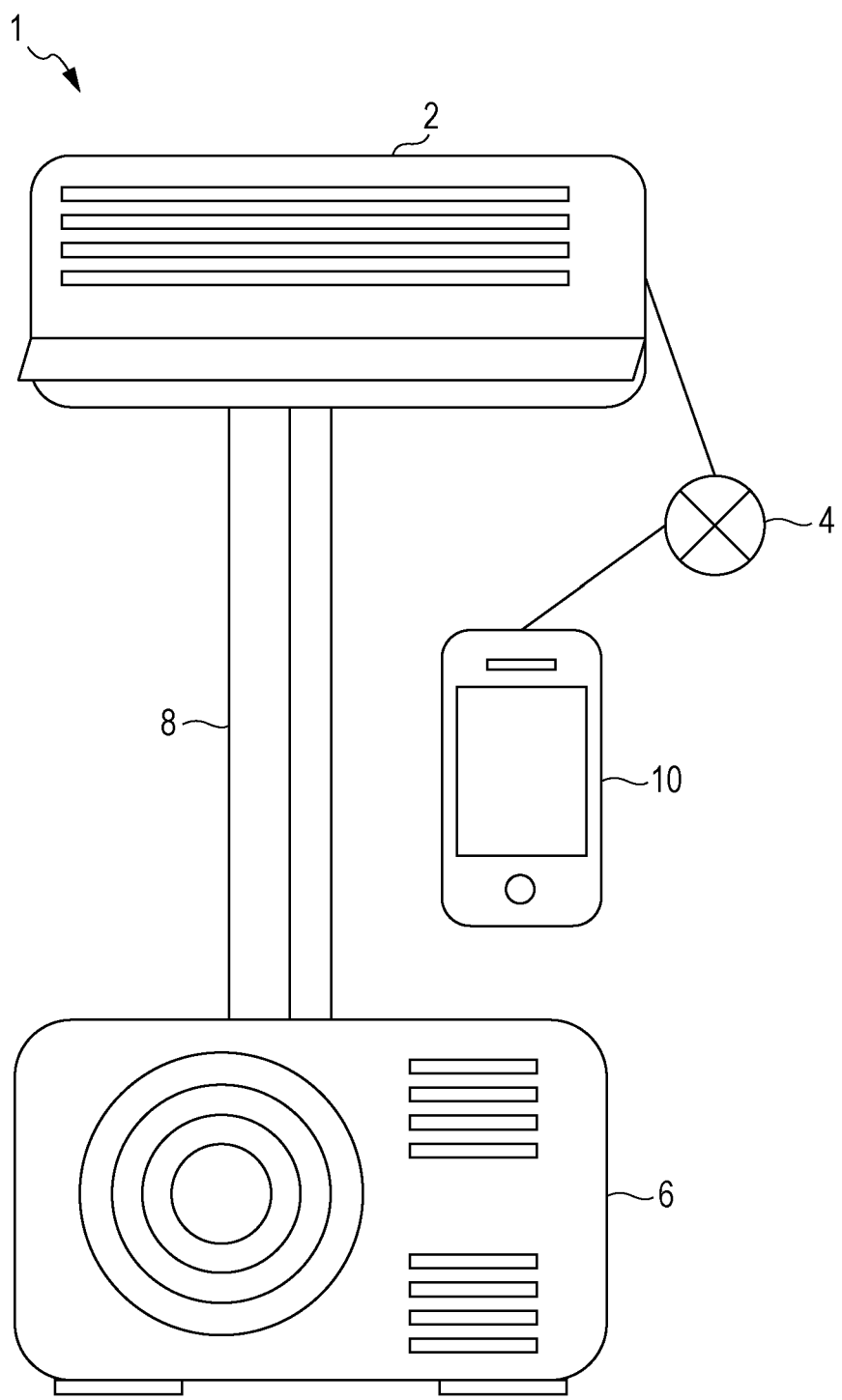
FIG. 5 is a diagram illustrating an overall configuration of an air conditioning system in the first embodiment.

FIG. 5 illustrates an overall configuration of an air conditioning system 1.

The air conditioning system 1 that performs air-conditioning of a room is constituted by an indoor unit 2 that is installed in the room, an outdoor unit 6 that is installed outside the room, the network 4, the information terminal 10 that remotely operates the indoor unit 2 over the network 4, and a connecting pipe 8 that connects the indoor unit 2 with the outdoor unit 6. The indoor unit 2 and the outdoor unit 6 are collectively referred to as an air conditioner.

The outdoor unit 6 includes a compressor, an outdoor fan, an outdoor heat exchanger, and the like, which are not illustrated. The compressor and the outdoor heat exchanger of the outdoor unit 6 are connected to the indoor unit 2 described below using a refrigerant pipe included in the connecting pipe 8, and function as a heat pump when a refrigerant is circulated.

The network 4 relays information exchanged between the indoor unit 2 and the information terminal 10. The network 4 is implemented on the basis of Ethernet (registered trademark) or WiFi (registered trademark).

The network 4 may be implemented by using a network based on other schemes as long as the network can relay information exchanged between the indoor unit 2 and the information terminal 10. For example, a network based on specified low-power wireless communication, such as Bluetooth (registered trademark) or ZigBee (registered trademark), power line communication, infrared communication, visible light communication, or ultrasonic communication may be used.

Figure 6:
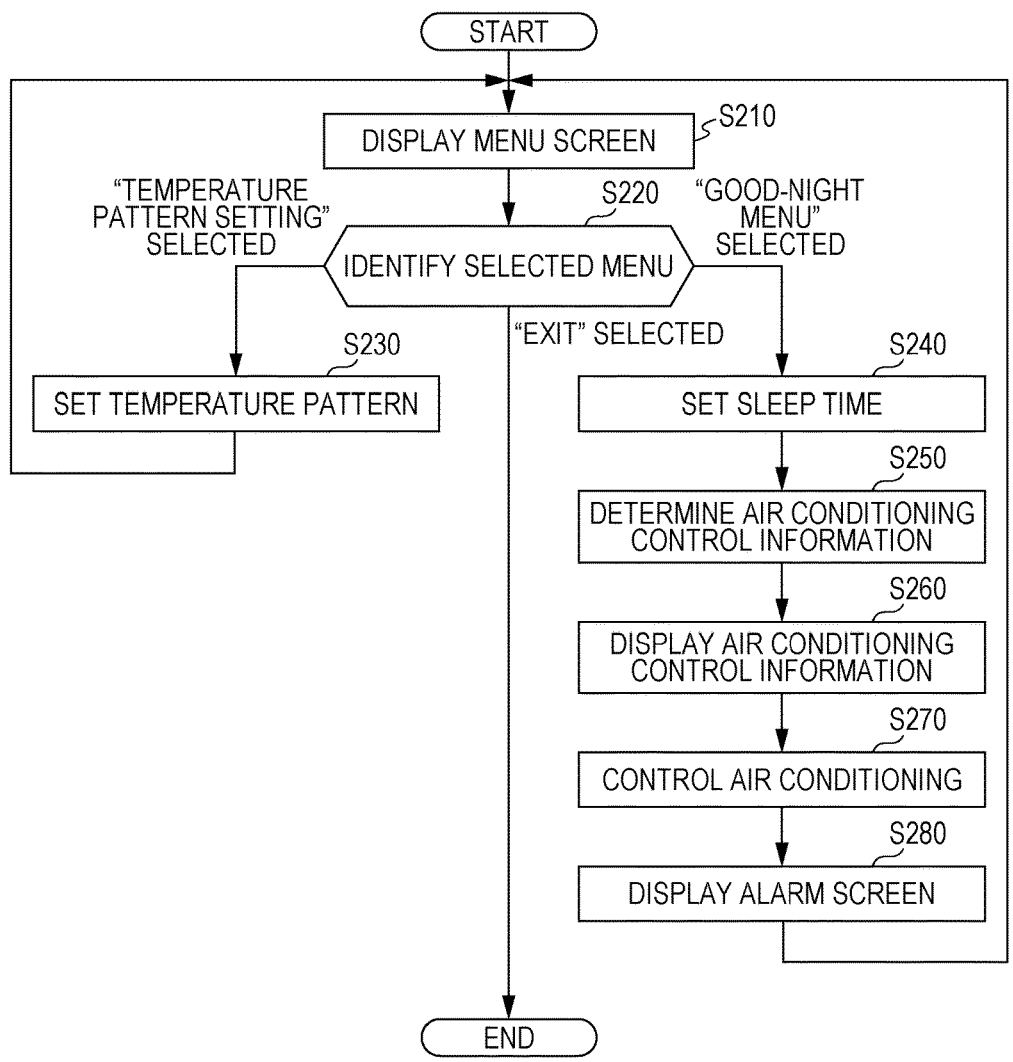
FIG. 6 is a flowchart illustrating a flow of processing performed by the information terminal in the first embodiment.

FIG. 6 illustrates a flow of processing performed by the control unit 50 of the information terminal 10.

First, the control unit 50 displays a menu screen on the touch panel unit 11 (step S210).

An example of the menu screen displayed in step S210 will be described with reference to FIG. 2.

The display control unit 52 included in the control unit 50 displays menu items shown to a user in the main display section 113 of the touch panel unit 11 of the information terminal 10. The display control unit 52 displays a temperature pattern setting button 121, a good-night menu button 122, and an exit button 123 as menu items.

Next, when the operation recognition unit 51 included in the control unit 50 recognizes a tap operation performed by a user with his/her finger, the succeeding processing to be performed by the control unit 50 branches in accordance with a menu item that was tapped (step S220).

If the temperature pattern setting button 121 has been tapped, the processing of the control unit 50 proceeds to step S230.

If the good-night menu button 122 has been tapped, the processing of the control unit 50 proceeds to step S240.

If the exit button 123 has been tapped, the control unit 50 ends the processing.

If the processing proceeds to step S230, the segment-by-segment preset temperature setting unit 54 included in the control unit 50 performs processing of making a user set the segment-by-segment preset temperature information 72. Thereafter, the processing of the control unit 50 returns to step S210 (step S230).

Figure 15:
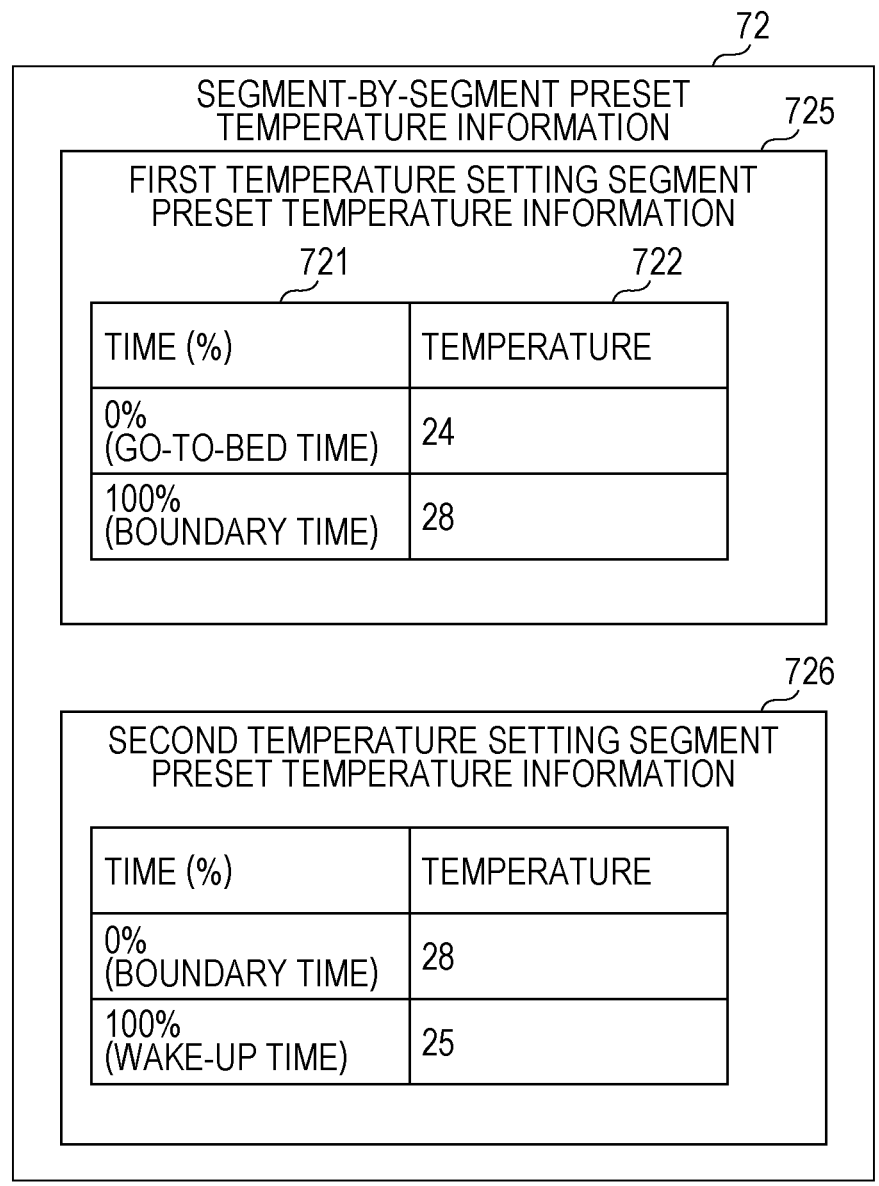
FIG. 15 is a diagram illustrating a configuration of segment-by-segment preset temperature information in the first embodiment.

FIG. 15 is a diagram illustrating a configuration of the segment-by-segment preset temperature information 72 that indicates temperatures set for each segment. Here, it is assumed that each segment corresponds to each time period. That is, a segment-by-segment preset temperature means a temperature that is set for a certain time period. The segment-by-segment preset temperature information 72 includes first temperature setting segment preset temperature information 725 and second temperature setting segment preset temperature information 726.

The first temperature setting segment preset temperature information 725 includes a preset temperature at a go-to-bed time and a preset temperature at a boundary time.

The second temperature setting segment preset temperature information 726 includes a preset temperature at the boundary time and a preset temperature at a wake-up time.

Note that the initial values of preset temperatures in the segment-by-segment preset temperature information 72 may be any values.

Next, a method used in order for a user to set the segment-by-segment preset temperature information 72 will be described.

Figure 7:
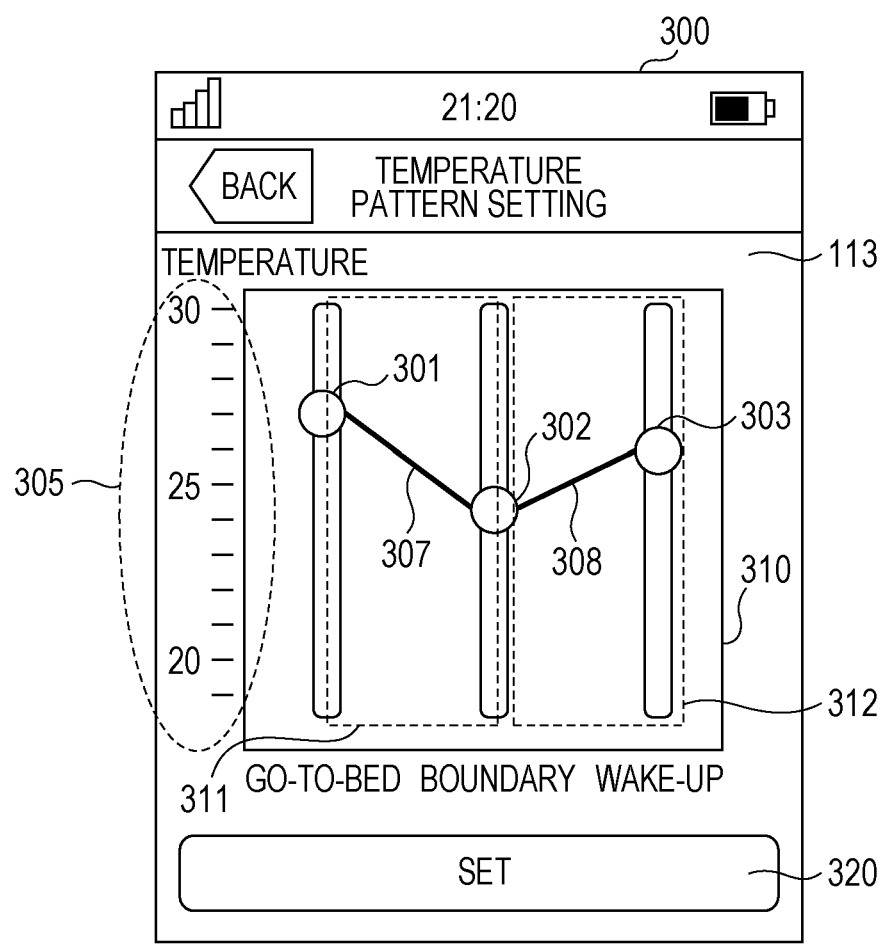
FIG. 7 is a diagram illustrating an example of operations for setting a segment-by-segment preset temperature in the first embodiment.

FIG. 7 is a diagram illustrating a segment-by-segment preset temperature setting screen 300, which is a screen for setting a temperature 722 (illustrated in FIG. 15)at predetermined time 721 (illustrated in FIG. 15). The segment-by-segment preset temperature setting unit 54 displays a graph area 310 and a set button 320 on the main display section 113 of the touch panel unit 11.

The graph area 310 includes a first slide bar 301 used to make a user set a preset temperature at the go-to-bed time, a second slide bar 302 used to make a user set a preset temperature at the boundary time, a third slide bar 303 used to make a user set a preset temperature at the wake-up time, and a temperature scale 305, which is the vertical axis. Here, the boundary time is a time in the early morning when the body temperature of human beings bottoms out in accordance with the circadian rhythm, and is assumed to be 4 a.m.

The graph area 310 includes a first temperature setting segment 311 located between the first slide bar 301 and the second slide bar 302, and a second temperature setting segment 312 located between the second slide bar 302 and the third slide bar 303.

The first temperature setting segment 311 corresponds to a time period from the go-to-bed time to the boundary time, and a first line 307 that connects a point corresponding to a preset temperature at the go-to-bed time and a point corresponding to a preset temperature at the boundary time is displayed in the first temperature setting segment 311.

The second temperature setting segment 312 corresponds to a time period from the boundary time to the wake-up time, and a second line 308 that connects the point corresponding to the preset temperature at the boundary time and a point corresponding to a preset temperature at the wake-up time is displayed in the second temperature setting segment 312.

Figure 8A:
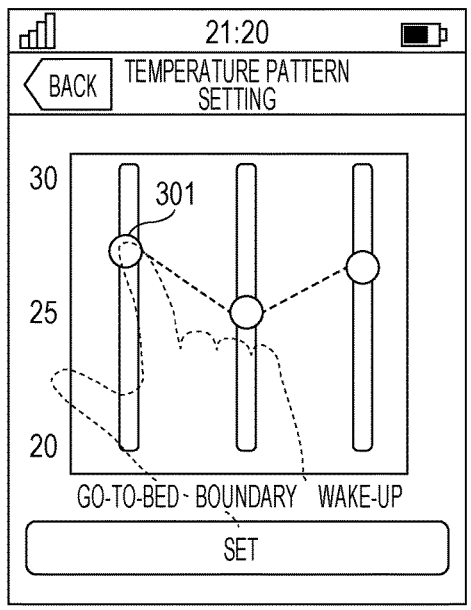
FIG. 8A is a diagram illustrating an example of operations for setting a segment-by-segment preset temperature in the first embodiment.
Figure 8B:
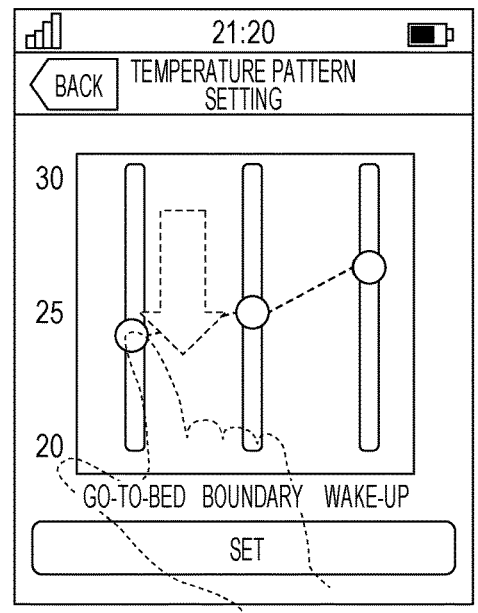
FIG. 8B is a diagram illustrating an example of operations for setting a segment-by-segment preset temperature in the first embodiment.

FIGS. 8A and 8B are diagrams illustrating operations for changing a preset temperature at the go-to-bed time performed by a user, in chronological order.

In order to change a preset temperature at the go-to-bed time, a user touches the first slide bar 301 with his/her finger and slides the finger upward or downward while keeping the finger on the screen. A preset temperature at the boundary time and a preset temperature at the wake-up time can also be changed by similar operations.

In the case where a user has changed a preset temperature, the segment-by-segment preset temperature setting unit 54 redraws the first line 307 and the second line 308 in accordance with the changed temperature. A temperature can be changed in increments of 1° C. In the case where a user slides his/her finger upward, the temperature increases in increments of 1° C. On the other hand, in the case where a user slides his/her finger downward, the temperature decreases in increments of 1° C.

FIG. 8B illustrates a state where operations for changing the preset temperature at the go-to-bed time from 27° C. to 24° C. is been performing.

FIG. 8B also illustrates a state where the first line 307 has been redrawn as a line that connects a point corresponding to 24° C., which is the preset temperature at the go-to-bed time, and a point corresponding to 25° C., which is the preset temperature at the boundary time, in response to the change made by a user on the preset temperature.

Figure 8C:
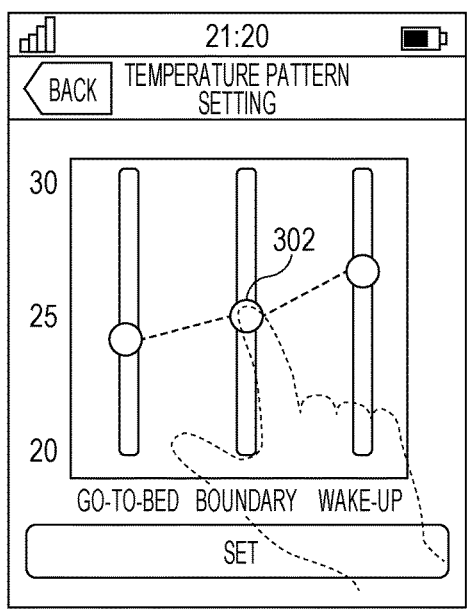
FIG. 8C is a diagram illustrating an example of operations for setting a segment-by-segment preset temperature in the first embodiment.
Figure 8D:
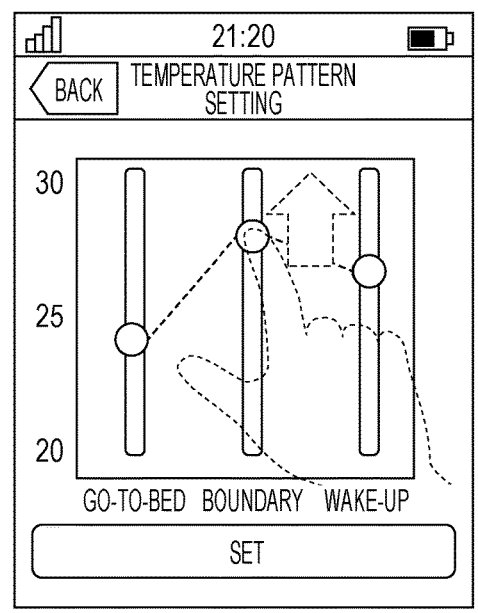
FIG. 8D is a diagram illustrating an example of operations for setting a segment-by-segment preset temperature in the first embodiment.

FIGS. 8C and 8D are diagrams illustrating operations for changing the preset temperature at the boundary time similarly performed by a user, in chronological order. An example in FIGS. 8C and 8D illustrates a state where a user has slid his/her finger upward on the second slide bar 302, so that operations for changing the preset temperature at the boundary time from 25° C. (FIG. 8C) to 28° C. (FIG. 8D) have been performed.

FIG. 8D illustrates a state where the first line 307 has been redrawn as a line that connects the point corresponding to 24° C., which is the preset temperature at the go-to-bed time, and a point corresponding to 28° C., which is the preset temperature at the boundary time, in response to the change made by a user on the preset temperature.

FIG. 8D also illustrates a state where the second line 308 has been redrawn as a line that connects the point corresponding to 28° C., which is the preset temperature at the boundary time, and a point corresponding to 26° C., which is the preset temperature at the wake-up time, in response to the change made by a user on the preset temperature.

Referring back to FIG. 6, if the processing proceeds to step S240, the sleep time information setting unit 55 included in the control unit 50 displays a screen for making a user set the sleep time information 73, and makes a user set the sleep time information 73 (step S240).

Figure 16:
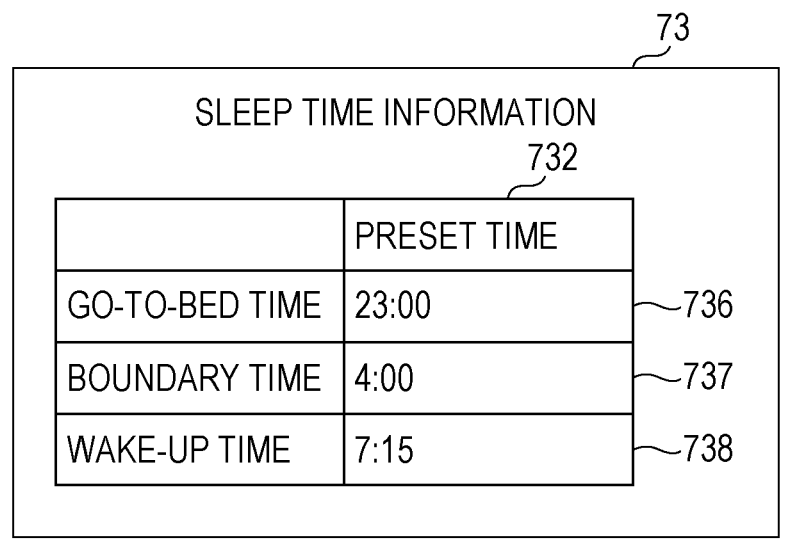

FIG. 16 is a diagram illustrating a configuration of the sleep time information 73. The sleep time information 73 includes preset time 732 which are a go-to-bed time 736, a boundary time 737, and a wake-up time 738.

The initial value of the boundary time 737 is 4 a.m., which is the time when the body temperature bottoms out in accordance with the circadian rhythm of typical human beings.

The initial value of the go-to-bed time 736 may be any time before the boundary time, and is 23:00 (11 p.m.), for example.

The initial value of the wake-up time 738 may be any time after the boundary time, and is 7:15 a.m., for example.

Next, a method used in order for a user to set the sleep time information 73 will be described.

Figure 9:
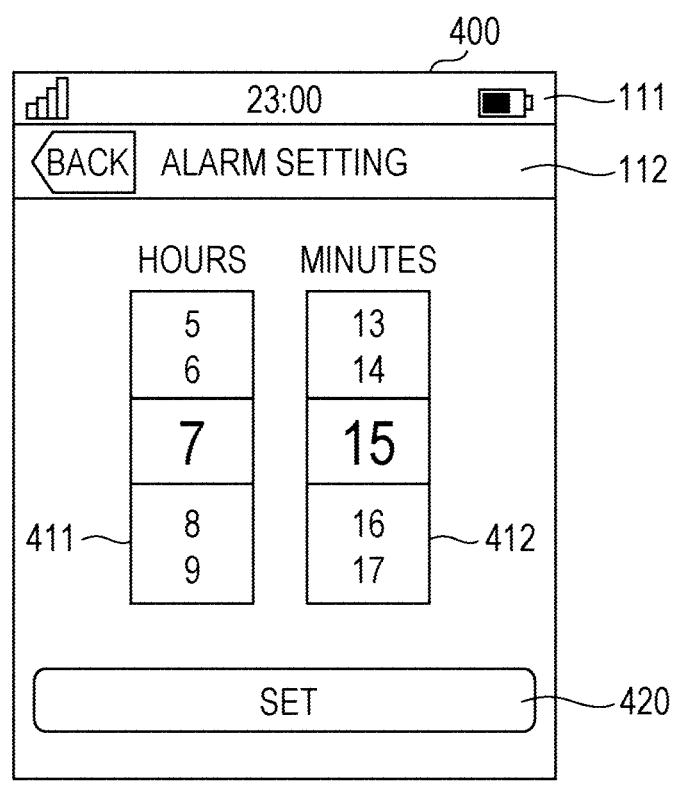
FIG. 9 is a diagram illustrating operations for setting sleep time information in the first embodiment.

FIG. 9 illustrates a sleep time information setting screen 400 for setting the sleep time information 73, which is displayed on the touch panel unit 11 by the sleep time information setting unit 55.

The sleep time information setting unit 55 displays on the main display section 113 of the touch panel unit 11a first spinner 411 used to make a user set the hour portion of the wake-up time, a second spinner 412 used to make a user set the minute portion of the wake-up time, and a set button 420 used by a user to fix the time that has been set.

Figure 10A:
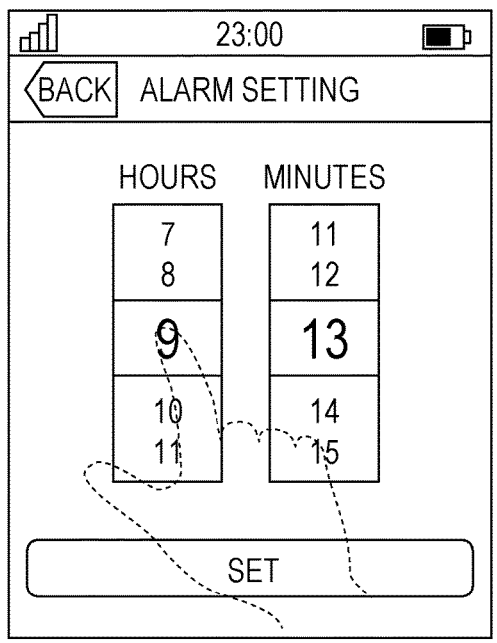
FIG. 10A is a diagram illustrating an example of operations for setting the sleep time information in the first embodiment.
Figure 10B:
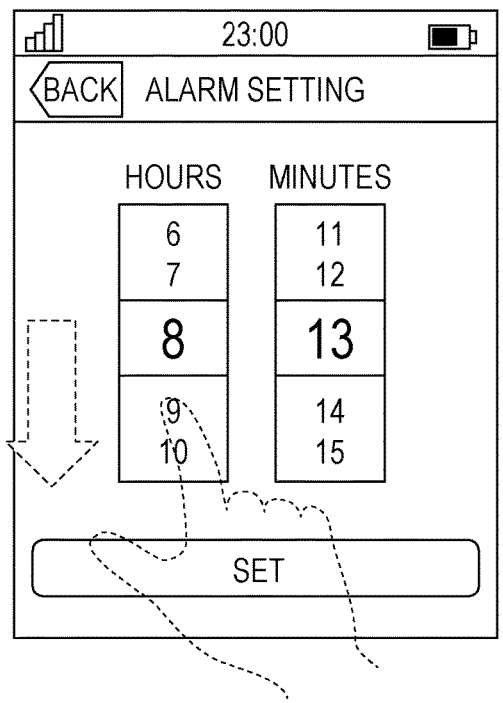
FIG. 10B is a diagram illustrating an example of operations for setting the sleep time information in the first embodiment.
Figure 10C:
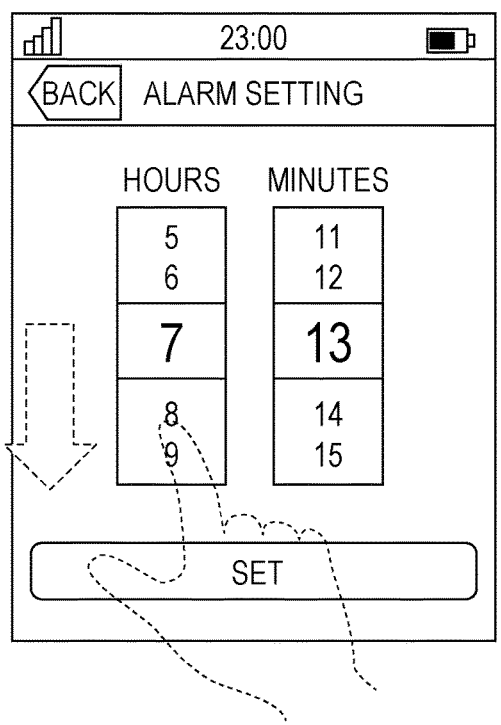
FIG. 10C is a diagram illustrating an example of operations for setting the sleep time information in the first embodiment.
Figure 11A:
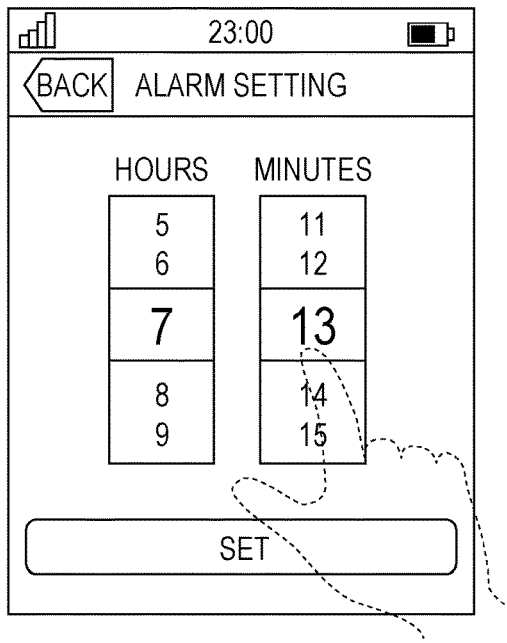
FIG. 11A is a diagram illustrating an example of operations for setting the sleep time information in the first embodiment.
Figure 11B:
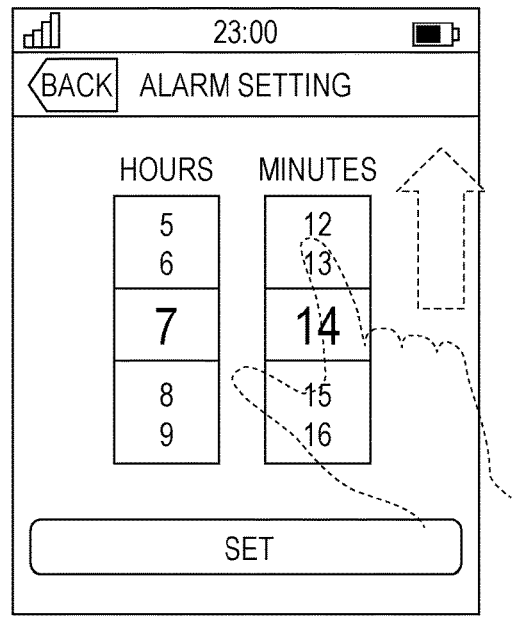
FIG. 11B is a diagram illustrating an example of operations for setting the sleep time information in the first embodiment.
Figure 11C:
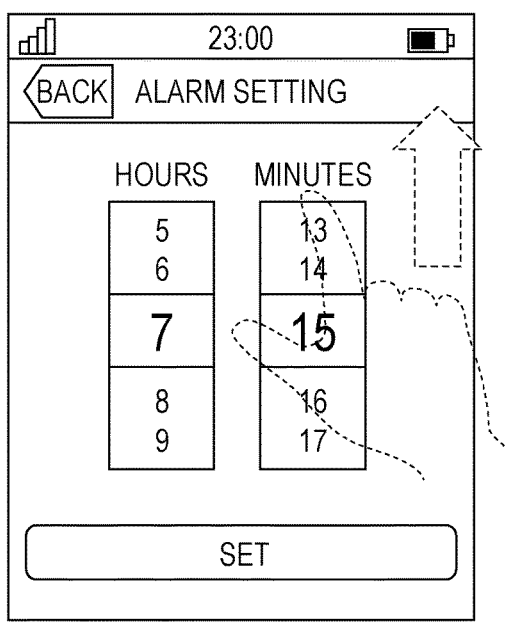
FIG. 11C is a diagram illustrating an example of operations for setting the sleep time information in the first embodiment.
Figure 11D:
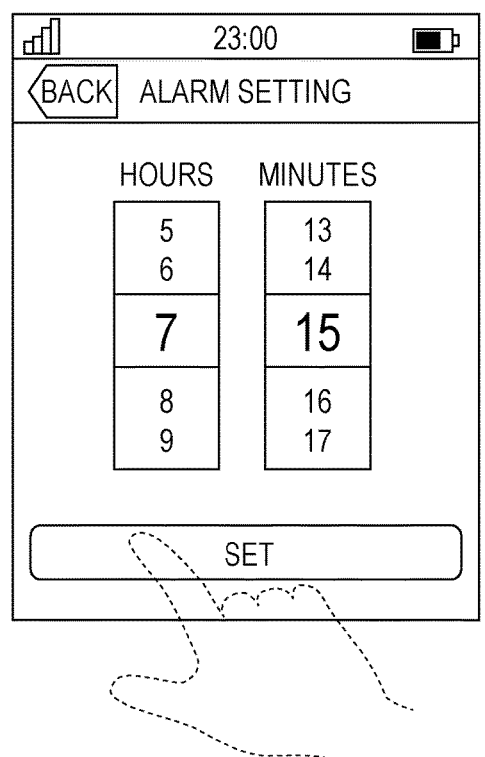
FIG. 11D is a diagram illustrating an example of operations for setting the sleep time information in the first embodiment.

FIGS. 10A to 10C are diagrams illustrating operations performed by a user in order to change the value of the hour portion (HOURS) of the wake-up time, in chronological order. Time passes in the order of FIG. 10A, FIG. 10B, and FIG. 10C.

A user touches the first spinner 411 with his/her finger and slides the finger upward or downward in order to change the value of the hour portion of the wake-up time.

In the case where a user slides his/her finger upward, the value of the hour increases in increments of one hour. On the other hand, in the case where a user slides his/her finger downward, the value of the hour decreases in increments of one hour.

FIGS. 11A to 11D are diagrams illustrating operations performed by a user in order to change the value of the minute portion (MINUTES) of the wake-up time. Time passes in the order of FIG. 11A, FIG. 11B, FIG. 11C, and FIG. 11D.

A user touches the second spinner 412 with his/her finger and slides the finger upward or downward in order to change the value of the minute portion of the wake-up time.

In the case where a user slides his/her finger upward, the value of the minute increases in increments of one minute. On the other hand, in the case where a user slides his/her finger downward, the value of the minute decreases in increments of one minute.

When a user taps the set button 420 (FIG. 11D) after setting the values of the hour and minute, the sleep time information setting unit 55 recognizes that the wake-up time has been fixed, and writes the wake-up time in the sleep time information 73.

At the same time, the sleep time information setting unit 55 writes a time that is a point in time when the user pressed the set button 420, in the sleep time information 73 as the go-to-bed time.

This is because, for people who usually set an alarm immediately before going to bed, a time when a wake-up time is set and a go-to-bed time are assumed to be the same.

Next, referring back to FIG. 6, the air conditioning control information determination unit 57 included in the control unit 50 determines the air conditioning control information 74 (step S250).

The air conditioning control information determination unit 57 calculates preset temperatures during a first time period, which is a time period between the go-to-bed time and the boundary time, and preset temperatures during a second time period, which is a time period between the boundary time and the wake-up time, by using information included in the segment-by-segment preset temperature information 72 and the sleep time information 73 to thereby generate the air conditioning control information 74.

FIG. 18 is a diagram illustrating a configuration of the air conditioning control information 74. The air conditioning control information 74 includes a preset time 741 indicating a time when control of the air conditioning system 1 is performed and a preset temperature 742 indicating a temperature at the preset time 741.

The air conditioning control information 74 is divided into first time period preset temperature information 745 and second time period preset temperature information 746.

Figure 17A:
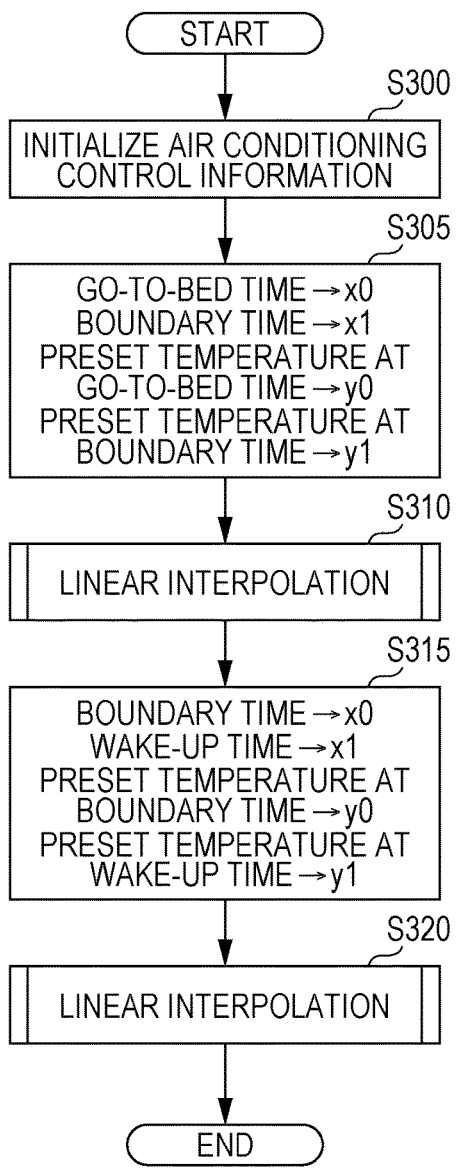
FIG. 17A is a flowchart illustrating a flow of processing performed by an air conditioning control information determination unit in the first embodiment.

FIG. 17A illustrates a flow of processing performed by the air conditioning control information determination unit 57. For example, a flow of processing performed in the case where preset temperatures during the first time period and preset temperatures during the second time period are determined using linear interpolation will be described.

First, the air conditioning control information determination unit 57 initializes the air conditioning control information 74. That is, the air conditioning control information determination unit 57 deletes all pieces of information included in the air conditioning control information 74 (step S300).

Next, the air conditioning control information determination unit 57 sets a go-to-bed time and a boundary time included in the sleep time information 73 and a preset temperature at the go-to-bed time and a preset temperature at the boundary time included in the segment-by-segment preset temperature information 72 as arguments, in order to determine preset temperatures during the first time period (step S305). The air conditioning control information determination unit 57 calls a subroutine for linear interpolation, which will be described below (step S310).

Next, the air conditioning control information determination unit 57 sets the boundary time and a wake-up time included in the sleep time information 73 and the preset temperature at the boundary time and a preset temperature at the wake-up time included in the segment-by-segment preset temperature information 72 as arguments, in order to determine preset temperatures during the second time period (step S315). The air conditioning control information determination unit 57 calls the subroutine for linear interpolation, which will be described below (step S320).

Figure 17B:
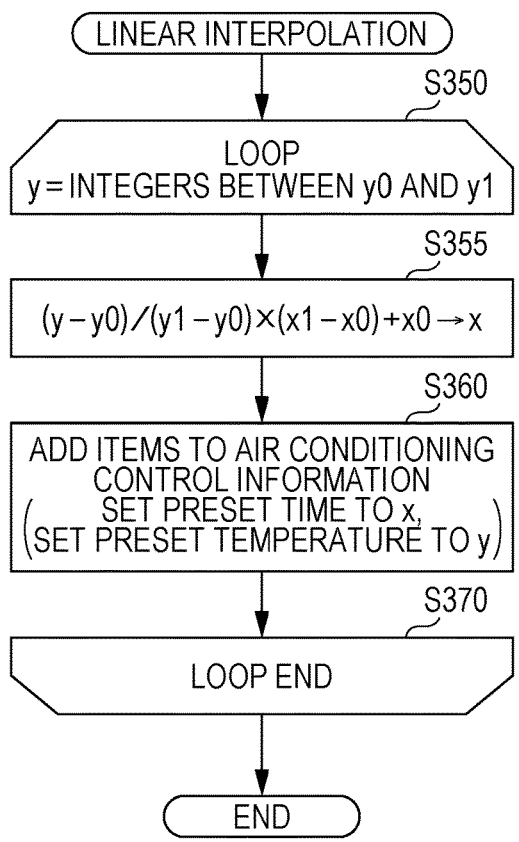
FIG. 17B is a flowchart illustrating a flow of processing performed by the air conditioning control information determination unit in the first embodiment.

FIG. 17B is a flow of processing performed in the subroutine for linear interpolation, which will be described below.

The air conditioning control information determination unit 57 takes a first time x0 (go-to-bed time), a second time x1 (boundary time), a first preset temperature y0 (preset temperature at the go-to-bed time), and a second preset temperature y1 (preset temperature at the boundary time) as arguments, in the subroutine for linear interpolation.

First, the air conditioning control information determination unit 57 performs loop processing, which is the subroutine for linear interpolation. As a loop variable y, integers between the first preset temperature y0 and the second preset temperature y1 are used (step S350).

Next, the air conditioning control information determination unit 57 calculates a value obtained by using an expression, (loop variable y—first preset temperature y0)/(second present temperature y1−first preset temperature y0)×(second time x1−first time x0), and calculates x, which is a value obtained by adding the first time x0 to the value obtained by using the expression (step S355).

Next, the air conditioning control information determination unit 57 adds, to the air conditioning control information 74, x, which is the value obtained in step S355, as the preset time 741, and the loop variable y as the preset temperature 742 (step S360). Then, the loop processing is finished (step S370).

In the subroutine for linear interpolation, the processing from steps S350 to S360 is repeatedly performed. A description of step S250 in FIG. 6 has been given above.

Referring back to FIG. 6, a flow of processing in step S260 and the succeeding processing will be described.

The air conditioning control information display unit 58 displays a screen on the touch panel unit 11 to thereby show the air conditioning control information 74 to a user (step S260).

Figure 12:
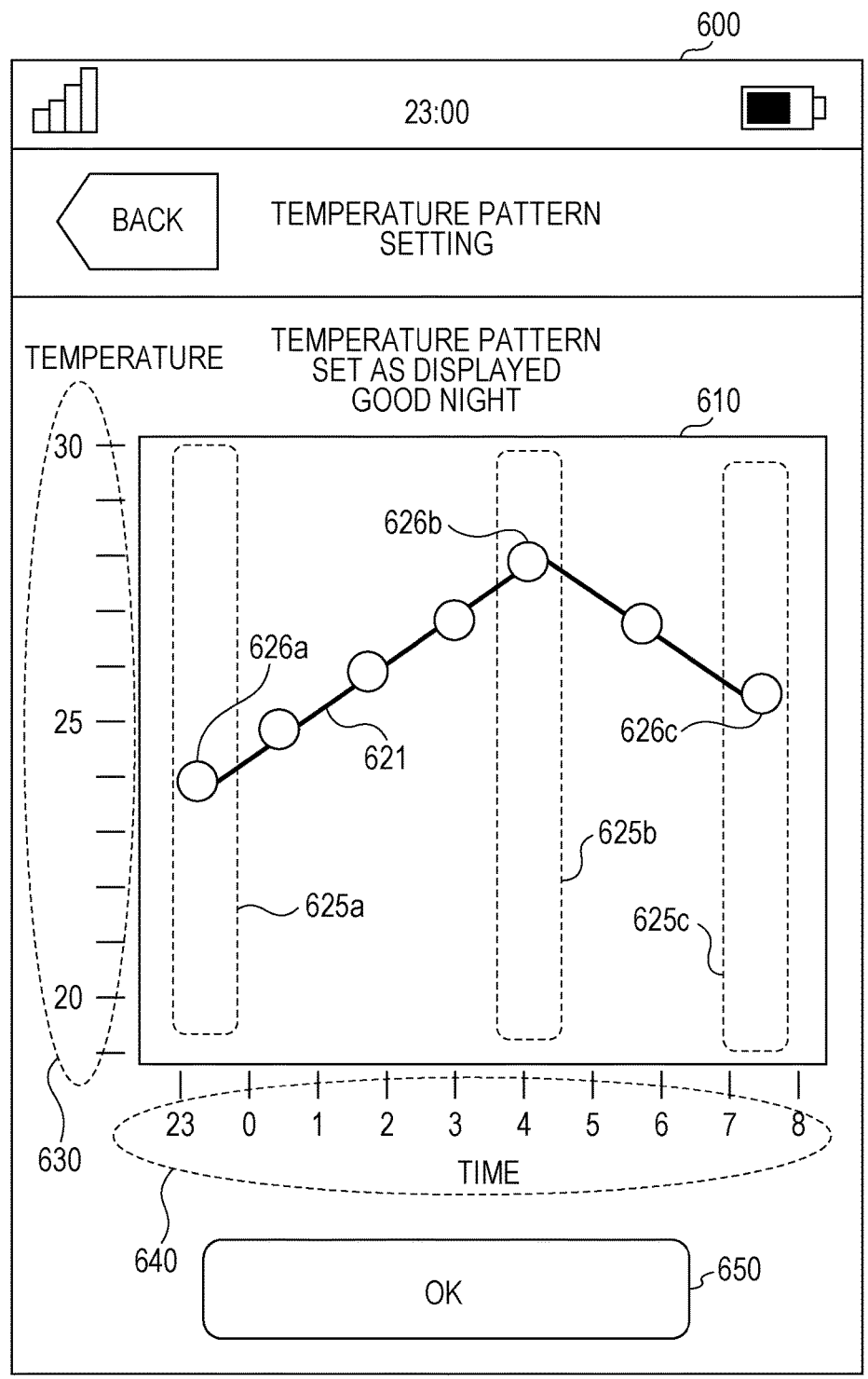
FIG. 12 is a diagram illustrating an example of operations for setting air conditioning control information in the first embodiment.

FIG. 12 illustrates an air conditioning control information display screen 600 displayed by the air conditioning control information display unit 58.

The air conditioning control information display unit 58 displays, on the main display section 113 of the touch panel unit 11, a graph area 610, a temperature scale 630 (vertical axis) that indicates a preset temperature, a time scale 640 (horizontal axis) that indicates a time when control of the air conditioner is performed, a chart 621 that corresponds to the air conditioning control information 74, and an ok button 650.

The graph area 610 includes a first slide bar 626*a* used to make a user set a preset temperature at the go-to-bed time, a second slide bar 626*b* used to make a user set a preset temperature at the boundary time, a third slide bar 626*c* used to make a user set a preset temperature at the wake-up time, range of movement 625*a* corresponding to the first slide bar 626*a*, range of movement 625*b* corresponding to the first slide bar 626*b*, and range of movement 625*c* corresponding to the first slide bar 626*c*.

The air conditioning control information display unit 58 displays, in the graph area 610, the chart 621 corresponding to the air conditioning control information 74 in the form of a line graph. The air conditioning control information display unit 58 marks points corresponding to preset temperatures at corresponding times on the graph area 610 for the number of elements included in the air conditioning control information 74 and connects the points with straight lines.

Figure 13:
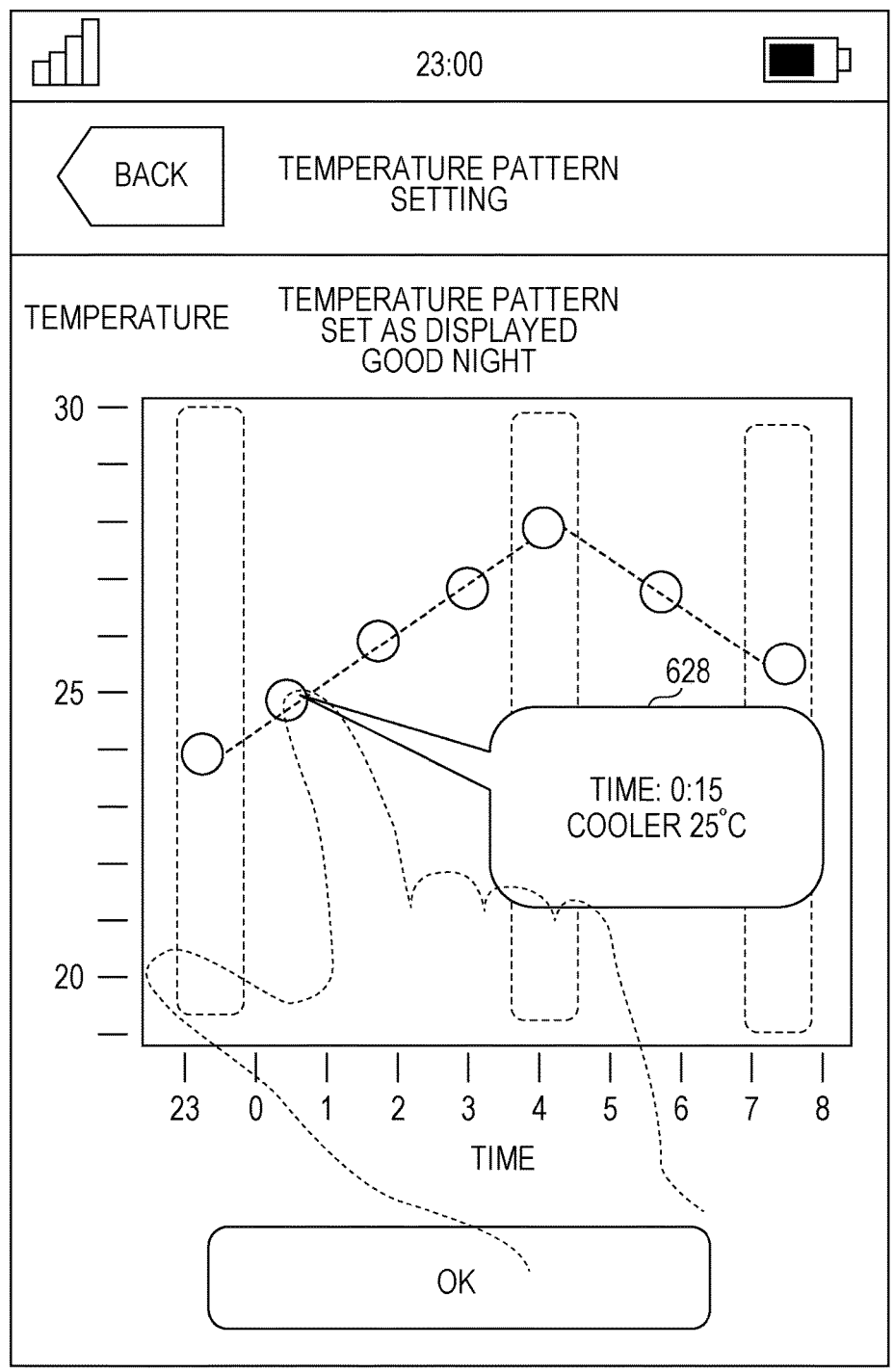
FIG. 13 is a diagram illustrating an example of operations for setting the air conditioning control information in the first embodiment.

In the case where a user touches a round graphic element that indicates a preset temperature at a corresponding time included in the air conditioning control information 74, information about each item in the air conditioning control information 74 which corresponds to the area touched by the user may be additionally displayed. That is, as illustrated in FIG. 13, a time corresponding to the area touched by the user and a preset temperature at the time may be additionally displayed. An example illustrated in FIG. 13 illustrates a state where, when a user touches a round graphic element that indicates a preset temperature of 25° C., a time corresponding to the graphic element and the preset temperature, which is 25° C., are displayed in a balloon area 628 as text.

The air conditioning control information display unit 58 displays on the touch panel unit 11*a* time and a preset temperature as text, so that a user can know the details of the air conditioning control information 74. Therefore, a user can sleep more soundly.

Next, referring back to FIG. 6, the air conditioning control unit 59 transmits a control signal corresponding to the preset time 741 and the preset temperature 742 written into the air conditioning control information 74 to the indoor unit 2 (step S270).

The indoor unit 2 controls the air conditioner (the indoor unit 2 and the outdoor unit 6) in accordance with the control signal.

For example, control to be performed by the air conditioning control unit 59 in the case where the air conditioning control information 74 has been set so as to include the values illustrated in FIG. 18 will be described in chronological order.

First, the air conditioning control unit 59 transmits to the indoor unit 2 a control signal for making the air conditioner operate at 23:00 at a temperature of 24° C.

Next, the air conditioning control unit 59 transmits to the indoor unit 2 a control signal for making the air conditioner operate at 0:15 at a temperature of 25° C.

The air conditioning control unit 59 performs similar processing at the succeeding times.

Next, the control unit 50 displays an alarm display screen 800 at a timing of the wake-up time (step S280).

Figure 14:
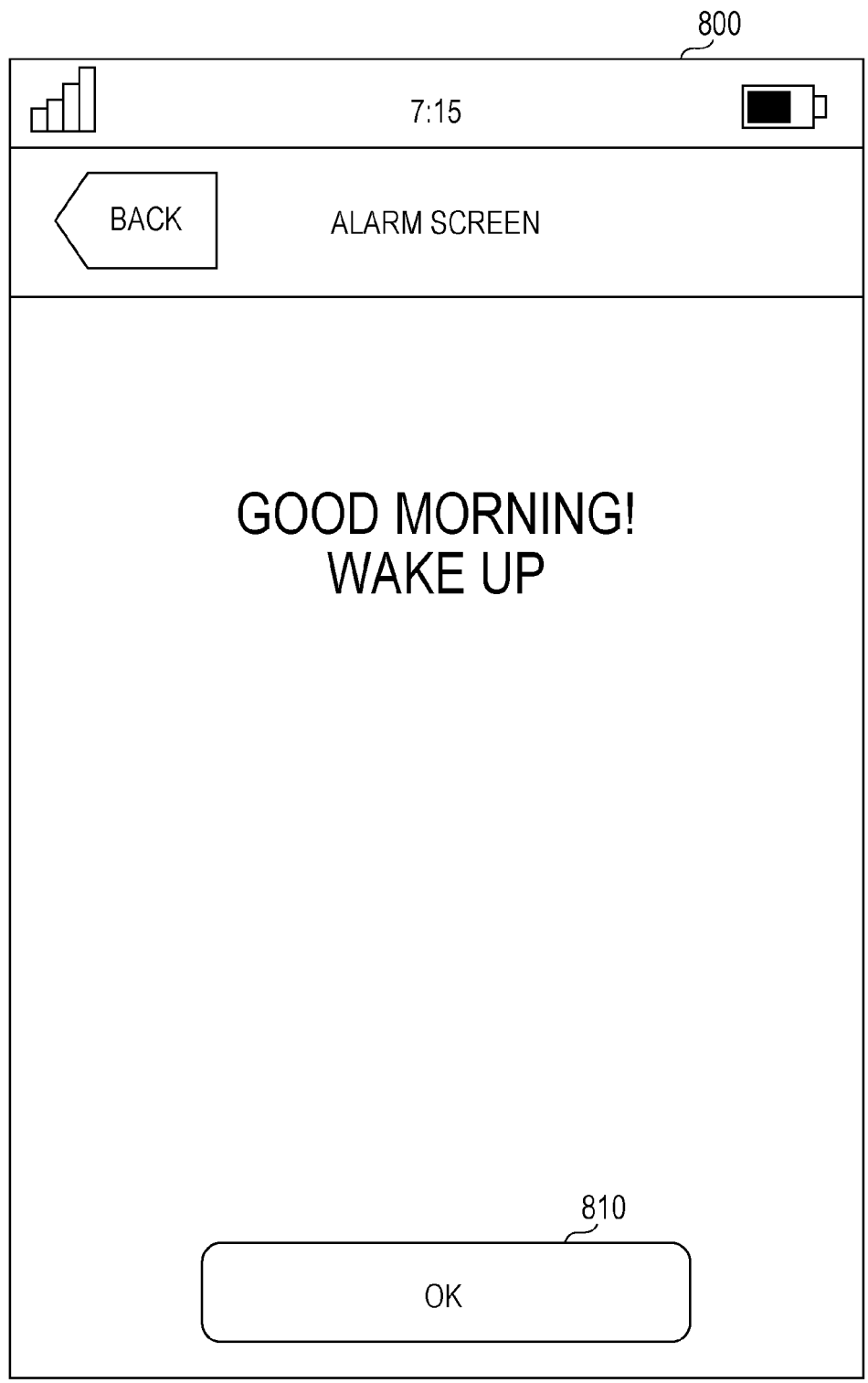
FIG. 14 is a diagram illustrating an example of an alarm display screen in the first embodiment.

FIG. 14 illustrates an example of the alarm display screen 800 displayed by the control unit 50. The alarm display 800 includes a ok button 810.

Note that the control unit 50 may give an instruction to the speaker 18 for playing a tune as appropriate. By playing a tune so as to stimulate a user with a sound, it is possible to encourage the user to wake up.

A series of processing performed by the information terminal 10 has been described.

Next, temperature setting operations performed in the air conditioning system 1 described in the first embodiment will be described while being compared with the technique disclosed in Japanese Unexamined Patent Application Publication No. 2001-343477.

In a description given below, it is assumed that the wake-up time is set to 7:15, the go-to-bed time is set to 23:00, the preset temperature at the go-to-bed time is set to 24° C., the preset temperature at the boundary time is set to 28° C., and the preset time at the wake-up time is set to 26° C.

Operations Performed by a User in the Case where Information Terminal Described in Japanese Unexamined Patent Application Publication No. 2001-343477 is Used First, a user calculates the time difference between the current time and the boundary time in his/her head.

The time difference calculated by the user in his/her head is five hours, which is obtained by subtracting 23:00 from 4:00. Accordingly, the user slides the first tab member 44 on a scale labeled 5H illustrated in FIG. 1 to a position corresponding to 28° C.

Next, the user calculates the time difference between the wake-up time and the current time in his/her head.

The wake-up time is 8 hours and 15 minutes, that is, about eight hours after the current time, which is obtained by subtracting 23:00 from 7:15. Accordingly, the user slides the first tab member 44 on a scale labeled 8H illustrated in FIG. 1 to a position corresponding to 26° C.

Next, the user resets the hourly temperatures at points in time between the go-to-bed time and the boundary time and at points in time between the boundary time and the wake-up time. Here, it is assumed that the current time is the go-to-bed time.

The user slides the first tab member 44 on a scale labeled 1H illustrated in FIG. 1 so as to set the temperature one hour after the go-to-bed time to 24° C. The user slides the first tab member 44 on a scale labeled 2H so as to set the temperature two hours after the go-to-bed time to 25° C. The user slides the first tab member 44 on a scale labeled 3H so as to set the temperature three hours after the go-to-bed time to 26° C. The user slides the first tab member 44 on a scale labeled 4H so as to set the temperature four hours after the go-to-bed time to 27° C. The user slides the first tab member 44 on a scale labeled 6H so as to set the temperature six hours after the go-to-bed time to 27° C. The user slides the first tab member 44 on a scale labeled 7H so as to set the temperature seven hours after the go-to-bed time to 27° C.

As described above, a user needs to calculate the difference between the go-to-bed time and the boundary time and the difference between the go-to-bed time and the wake-up time in his/her head, and to perform temperature setting by sliding the first tab member 44 for each hour, which involves troublesome operations.

Operations Performed by a User in the Case where Information Terminal 10 Described in the First Embodiment is Used First, a user slides his/her finger on the first slide bar 301 in the segment-by-segment preset temperature setting screen 300 illustrated in FIG. 7 so as to set the temperature at the go-to-bed time to 24° C.

Next, the user slides his/her finger on the second slide bar 302 so as to set the temperature at the boundary time to 28° C.

Next, the user slides his/her finger on the third slide bar 303 so as to set the temperature at the wake-up time to 28° C., and taps the set button 320.

Next, the user sets the wake-up time in the sleep time information setting screen 400 illustrated in FIG. 9.

As described above, in the case where the information terminal 10 in the first embodiment is used, a user need not calculate the time difference between the wake-up time and the go-to-bed time in his/her head. Furthermore, a user need not slide the first tab members 44 on scales respectively labelled 1H to 8H as illustrated in FIG. 1.

By using the information terminal 10 in the first embodiment, temperature setting taking into consideration the circadian rhythm is easily performed even in the case where the go-to-bed time is changed the next day at night.

It is assumed that the boundary time is 4 a.m. at which the body temperature decreases to the lowest value according to the circadian rhythm, however, the boundary time need not be 4 a.m. exactly. Some error may be allowed by taking into consideration the fineness of the time setting of the air conditioner and the battery life of a battery used in the information terminal 10. For example, an error of about 30 minutes may be allowed.

In the segment-by-segment preset temperature setting screen 300 illustrated in FIG. 7 displayed by the segment-by-segment preset temperature setting unit 54, slide bars are used as a user interface for setting preset temperatures, however, other means may be used as long as a temperature at the go-to-bed time, a temperature at the boundary time, and a temperature at the wake-up time can be set with the means.

FIGS. 28A to 28D illustrate another example of the setting screen displayed by the segment-by-segment preset temperature setting unit 54. In this example, areas used to directly input numeric values are provided.

In the case where a user changes the temperature at the go-to-bed time, the user can set the temperature to a desired value by tapping an area 281 that indicates the temperature at the go-to-bed time and then tapping numbers on a software keyboard 282, which is displayed in the setting screen in response to the former tapping.

In the first embodiment, a case has been described where one information terminal 10 includes the control unit 50 and the storage unit 70, however, a plurality of information terminals may respectively include the control unit 50 and the storage unit 70. Alternatively, the control unit 50 may be distributed to a plurality of terminals.

Second Embodiment

Figure 19:
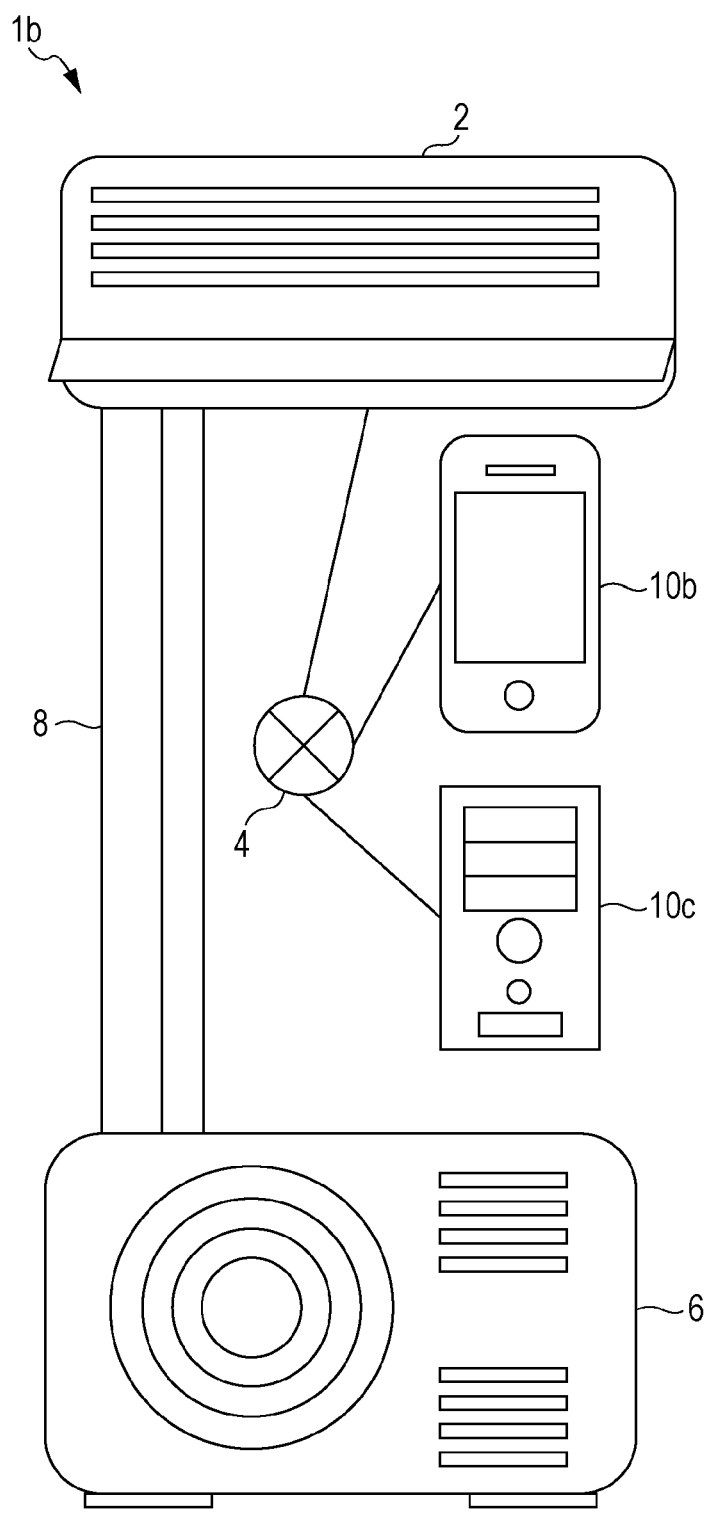
FIG. 19 is a diagram illustrating an overall configuration of an air conditioning system in a second embodiment.

FIG. 19 illustrates an example of an overall configuration of an air conditioning system 1b in the second embodiment. In FIG. 19, a constituent element similar to that in FIG. 5 is given the same reference numeral and description thereof will be omitted.

The air conditioning system 1b illustrated in FIG. 19 includes a second information terminal 10b and a third information terminal 10c instead of the information terminal 10.

The network 4 relays information exchanged among the indoor unit 2, the second information terminal 10b, and the third information terminal 10c.

Figure 20:
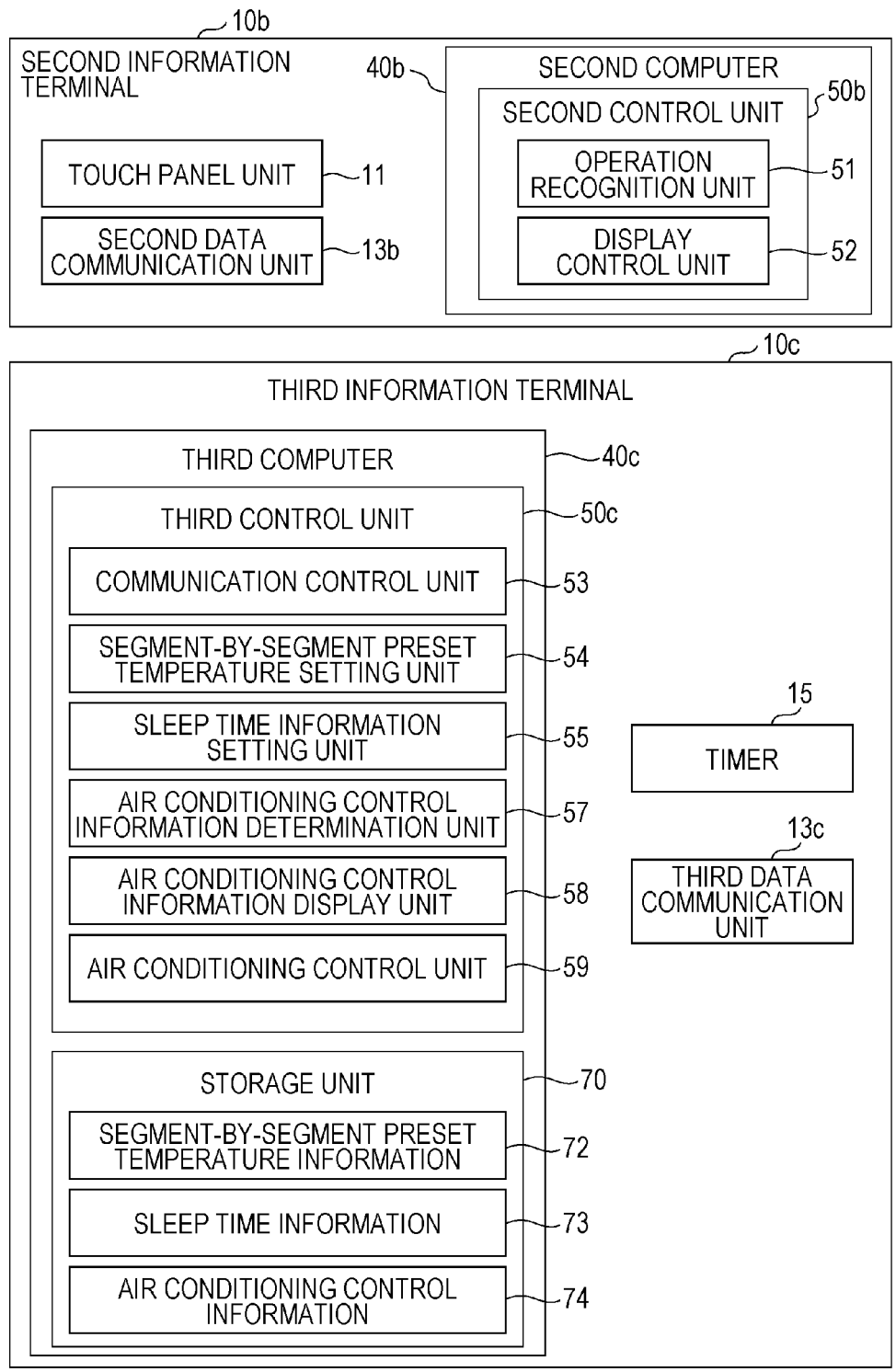
FIG. 20 is a diagram illustrating configurations of information terminals in the second embodiment of the present invention.

FIG. 20 illustrates configurations of the second information terminal 10b and the third information terminal 10c. In FIG. 20, a constituent element similar to that in FIG. 4 is given the same reference numeral and description thereof will be omitted.

The second information terminal 10b includes the touch panel unit 11, a second data communication unit 13b, and a second computer 40b that includes a second control unit 50b.

The second control unit 50b includes the operation recognition unit 51 and the display control unit 52.

The third information terminal 10c includes the timer 15, a third data communication unit 13c, and a third computer 40c. The third computer 40c includes a third control unit 50c and the storage unit 70.

The third control unit 50c includes the communication control unit 53, the segment-by-segment preset temperature setting unit 54, the sleep time information setting unit 55, the air conditioning control information determination unit 57, the air conditioning control information display unit 58, and the air conditioning control unit 59. The segment-by-segment preset temperature setting unit 54 makes a user set the segment-by-segment preset temperature information 72. The sleep time information setting unit 55 makes a user set the sleep time information 73. The air conditioning control information determination unit 57 determines the air conditioning control information 74 on the basis of information that is obtained by the segment-by-segment preset temperature setting unit 54 and the sleep time information setting unit 55 making a user set the information. The air conditioning control information display unit 58 displays information determined by the air conditioning control information determination unit 57 on the touch panel unit 11. The air conditioning control unit 59 transmits a control command to the indoor unit 2 on the basis of the information determined by the air conditioning control information determination unit 57.

The second data communication unit 13b communicates with the third data communication unit 13c, transmits an operation on the touch panel unit 11 performed by a user and recognized by the operation recognition unit 51 to the third control unit 50c, and receives information in a screen to be displayed on the touch panel unit 11 from the third control unit 50c.

In the air conditioning system 1b in the second embodiment, the second control unit 50b and the third control unit 50c communicate input from a user or information to be displayed to a user via the second data communication unit 13b included in the second information terminal 10b and the third data communication unit 13c included in the third information terminal 10c respectively to thereby perform processing similar to that performed by the information terminal 10 in the first embodiment.

The second information terminal 10b includes the touch panel unit 11 and the display control unit 52 so as to mainly perform processing relating to an interface between a user and the third information terminal 10c. The second information terminal 10b need not include the storage unit 70, which is included in the information terminal 10 in the first embodiment. Accordingly, the second information terminal 10b can be implemented with a simple configuration.

The third information terminal 10c need not include the touch panel unit 11, which occupies a large volume, and therefore can be implemented by mainly using a CPU and a recording medium, which results in a smaller physical size.

Note that the third information terminal 10c may be installed anywhere as long as the third information terminal 10c can communicate with the indoor unit 2 over the network 4. The third information terminal 10c need not always be carried by a user and therefore can remain plugged into a power supply. Accordingly, an unexpected situation can be avoided in which the air conditioning control unit 59 cannot operate due to accidental battery exhaustion.

Furthermore, the third information terminal 10c may be placed outside the house of a user. When the third information terminal 10c is placed outside the house of a user, the user can use more space in his/her house.

Third Embodiment

Figure 21A:
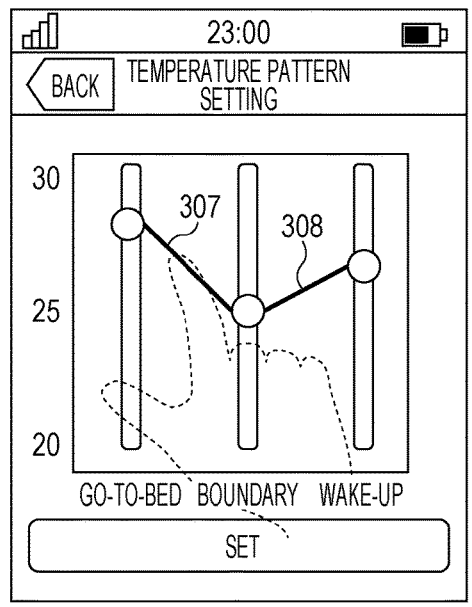
FIG. 21A is a diagram illustrating an example of operations for setting a segment-by-segment preset temperature in a third embodiment.
Figure 21B:
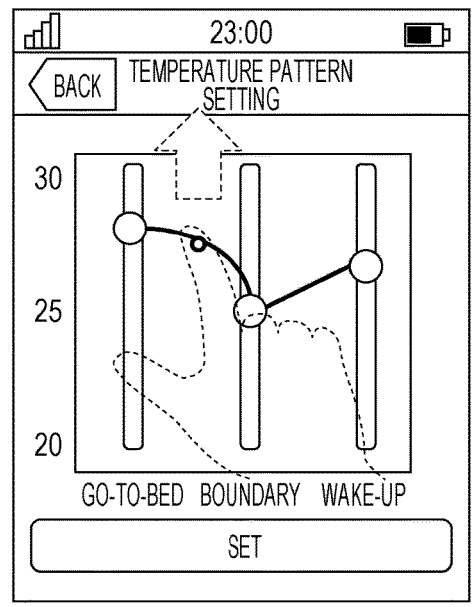
FIG. 21B is a diagram illustrating an example of operations for setting a segment-by-segment preset temperature in the third embodiment.
Figure 21C:
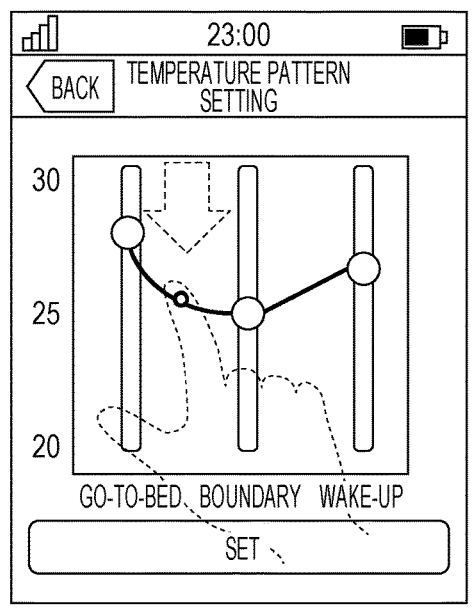
FIG. 21C is a diagram illustrating an example of operations for setting a segment-by-segment preset temperature in the third embodiment.

FIGS. 21A to 21C illustrate operations performed by a user in order to change preset temperatures of the air conditioner, in chronological order. In FIGS. 21A to 21C, a constituent element similar to that illustrated in FIG. 7 and FIGS. 8A to 8D is given the same reference numeral and description thereof will be omitted.

In the first embodiment, the first line 307 and the second line 308 are each interpolated with a line segment. In the third embodiment, an inflection point is set on each of the first line 307 and the second line 308, and the first line 307 and the second line 308 are each interpolated with a curve. Accordingly, temperature setting of the air conditioner can be performed more flexibly.

When a user touches the first line 307 with his/her finger and slides the finger upward or downward, the first line 307 can be changed so as to have an upward or downward convex shape.

FIG. 21B illustrates an operation when a user slides his/her finger upward. When a user slides his/her finger upward, the first line 307 is changed so as to have an upward convex shape.

On the other hand, FIG. 21C illustrates an operation when a user slides his/her finger downward. When a user slides his/her finger downward, the first line 307 is changed so as to have a downward convex shape.

The same operations as in the case of the first line 307 apply to the second line 308. When a user touches the second line 308 with his/her finger and slides the finger upward or downward, the second line 308 can be changed so as to have an upward or downward convex shape.

In the case where the first line 307 or the second line 308 is set as a curve that shows a monotonic increase and is convex upward, or in the case where the first line 307 or the second line 308 is set as a curve that shows a monotonic decrease and is convex downward, the temperature first changes rapidly, and thereafter changes gradually.

For example, In the case where the difference between the room temperature and a desired temperature is large and a user would like to immediately cool the room, for example, the first line 307 may be set in the shape described above.

On the other hand, in the case where the first line 307 or the second line 308 is set as a curve that shows a monotonic increase and is convex downward, or in the case where the first line 307 or the second line 308 is set as a curve that shows a monotonic decrease and is convex upward, the temperature first changes gradually, and thereafter changes rapidly.

in the case where a user does not like a rapid temperature change immediately after going to bed, the first line 307 may be set in the shape described above.

In the third embodiment, a case has been described where a preset temperature during the time period between the go-to-bed time and the boundary time and a preset temperature during the time period between the boundary time and the wake-up time are each interpolated with a curve having an inflection point. In this way, temperature setting of the air conditioner finely meeting a preference that differs depending on the user can be performed.

Fourth Embodiment

Figure 22:
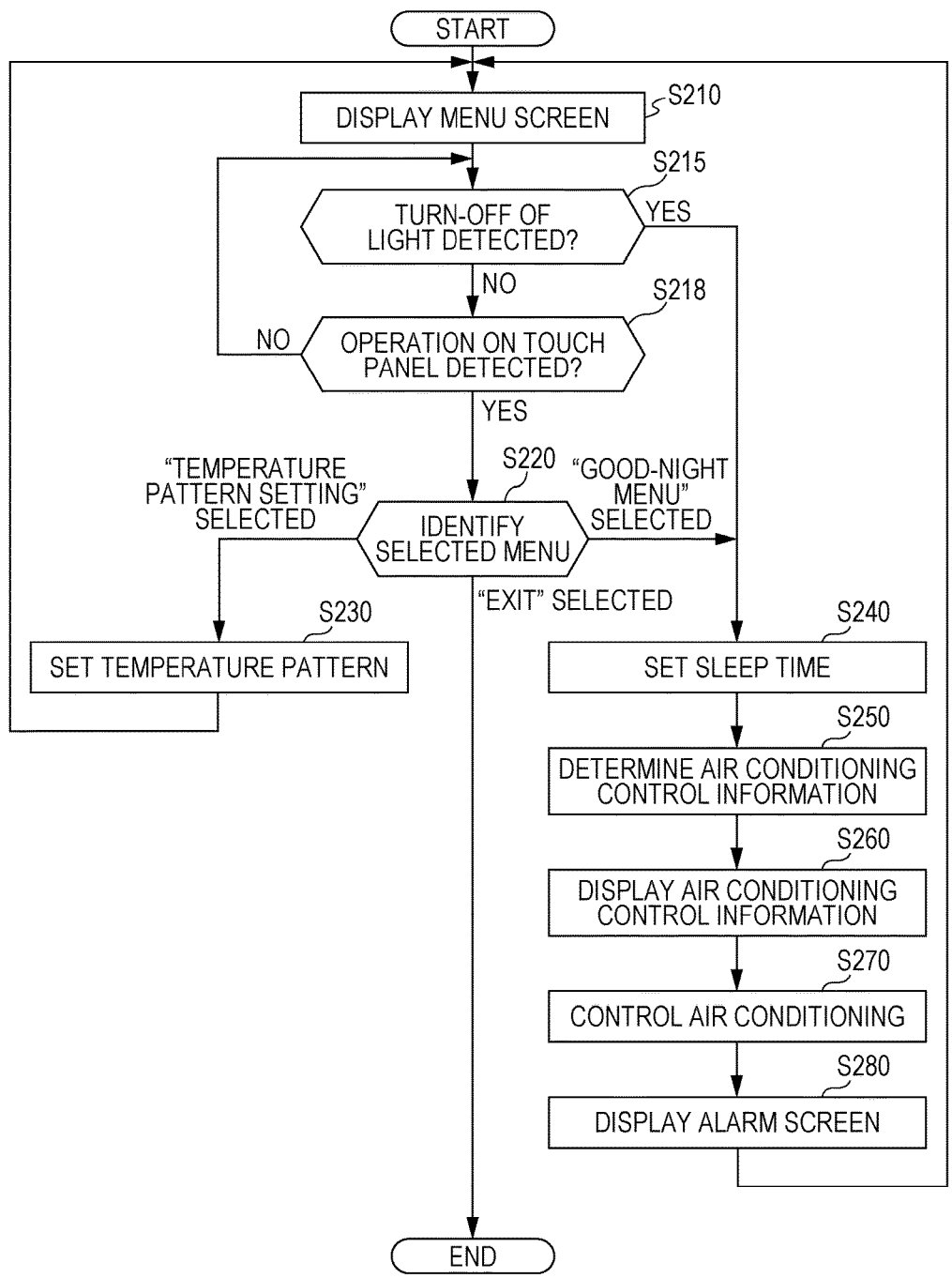
FIG. 22 is a flowchart illustrating a flow of processing performed by an information terminal in a fourth embodiment.

A flow of processing performed by the control unit 50 of the information terminal 10 in the fourth embodiment will be described with reference to FIG. 22. In FIG. 22, a step similar to that in FIG. 6 is given the same reference numeral as in FIG. 6 and description thereof will be omitted.

The control unit 50 included in the information terminal 10 displays the menu screen in step S210. The control unit 50 thereafter senses a change in the ambient illuminance using the illuminance sensor 20 (illustrated in FIG. 2), and determines whether or not the room light was turned off in step S215. It is assumed that the illuminance sensor 20 is included in the information terminal 10.

If the result of determination in step S215 is Yes (that is, the room light was turned off), the processing proceeds to step S240, which is a step of setting a sleep time, and the time when the room light was turned off is set as the go-to-bed time.

If the result of determination in step S215 is No (that is, the room light was not turned off), the processing proceeds to step S218.

In step S218, the control unit 50 determines whether or not a user touched the touch panel unit 11. If the result of determination in step S218 is Yes (that is, a user touched the touch panel unit 11), the processing of the control unit 50 proceeds to step S220. If the result of determination in step S218 is No (that is, a user did not touch the touch panel unit 11), the processing of the control unit 50 returns to step S215.

As described above, when turn-off of the room light by a user is automatically detected in step S215, the processing of the information terminal 10 transitions to sleep time setting processing (step S240).

The processing of the information terminal 10 automatically transitions to sleep time setting processing and therefore the wake-up time can be set without a user consciously performing an operation on the menu with his/her finger.

With the information terminal 10 in the fourth embodiment, time used and effort made by a user in operations can be reduced. Accordingly, it is also possible to prevent a user from forgetting to set the temperature.

Note that the information terminal 10 may be configured so as to include another menu item in the menu screen to thereby allow a user to select whether or not automatic control by the illuminance sensor 20 and automatic transition from detection of turn-off to wake-up time setting are activated. In this way, air conditioning control that is appropriate for both a user who prefers such automatic control and a user who does not prefer such automatic control can be provided.

Fifth Embodiment

Figure 23:
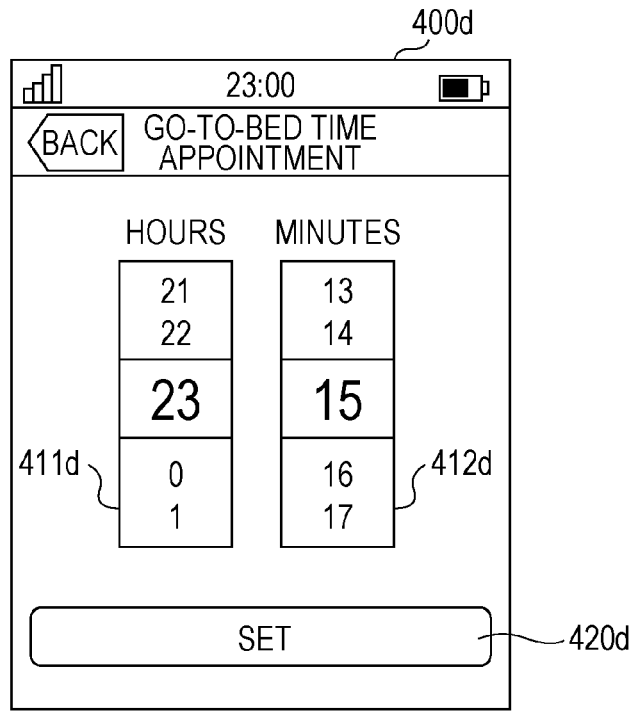
FIG. 23 is a diagram illustrating an example of a go-to-bed time appointment screen in a fifth embodiment.

FIG. 23 illustrates an operation screen 400d used in order for a user to set in advance the go-to-bed time to be included in the sleep time information 73 in the information terminal 10 according to the fifth embodiment of the present invention.

A user performs operations similar to those for setting the sleep time information 73 in the first embodiment.

A user can set the go-to-bed time by sliding his/her finger on a first spinner 411d and a second spinner 412d. A user can fix the go-to-bed time that has been set by tapping the set button 420d.

If a user appoints the go-to-bed time in advance so as to make the air conditioner start operating at a point in time before the go-to-bed time (for example, ten minutes before the go-to-bed time), such an appointment is effective in case a room where a user is going to sleep is not sufficiently cooled during a hot summer night, for example.

Sixth Embodiment

A flow of processing performed by the control unit 50 included in the information terminal 10 in the sixth embodiment will be described.

First, the control unit 50 displays a going-out time setting screen 400e on the touch panel unit 11, and makes a user input a daily going-out time. Here, it is assumed that a going-out time is a time when a user goes out for the first time after waking up.

Figure 24:
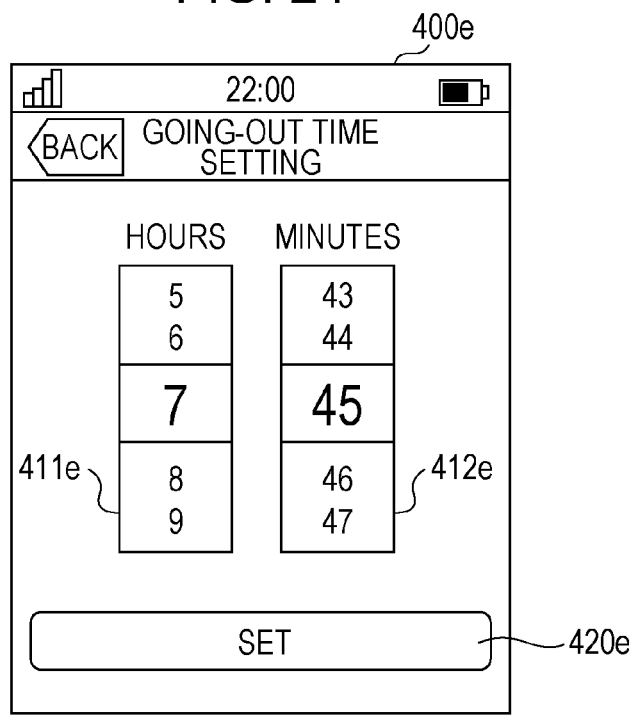
FIG. 24 is a diagram illustrating an example of a going-out time setting screen in a sixth embodiment.

FIG. 24 illustrates an example of the going-out time setting screen 400e displayed by the control unit 50.

The going-out time setting screen 400e includes a first spinner 411e for setting the value of the hour of a going-out time, a second spinner 412e for setting the value of the minute of the going-out time, and a set button 420e.

A user can set a going-out time by sliding his/her finger on the first spinner 411e and the second spinner 412e similarly to operations for setting the sleep time information 73 in the first embodiment. A user can fix the going-out time that has been set by tapping the set button 420e.

Next, the control unit 50 calculates the boundary time using the going-out time.

The control unit 50 writes a value obtained by subtracting about three hours from the going-out time inputted by a user in the sleep time information 73 as the boundary time. This can make the information terminal 10 automatically perform approximate calculation of the boundary time when the body temperature of a user bottoms out, on the basis of the going-out time that is in a time period during which the user is exposed to sunlight in the morning, by taking into consideration a physiological characteristic of human beings such that the circadian rhythm is reset by exposure to sunlight.

For people who have a daily rhythm different from typical people due to working a night shift or an early-morning shift, a time when such people are exposed to sunlight for the first time in the day also shifts compared with typical people. Accordingly, it is known that the circadian rhythm of such people also shifts.

The reason why the difference between the boundary time and the going-out time is assumed to be about three hours will be described. Generally, a time when students go out to school or a time when office workers go out to work on weekdays is within a time period of about one hour from 7 a.m., which is obtained by subtracting about one hour used for commuting from a start time of school or work, which is between 8 a.m. and around 9 a.m. The time when the body temperature bottoms out in accordance with the circadian rhythm is around 4 a.m. Accordingly, the difference between the boundary time and the going-out time is assumed to be about three hours by calculating the difference between 7 a.m. and 4 a.m.

For a region where daylight-saving time is introduced or for a region where a start time of school or work varies from a typical time, for example, a margin of about one hour may be allowed for the value that is to be subtracted.

With the information terminal 10 in the sixth embodiment, air conditioning that meets the circadian rhythm is provided to users whose daily schedule is different from typical people due to working a night shift or an early-morning shift, that is, users whose circadian rhythm is different from typical people.

Accordingly, the information terminal 10 in the sixth embodiment is effective in the case where a user is not familiar with changes in the body temperature according to the circadian rhythm.

Seventh Embodiment

The information terminal 10 according to the seventh embodiment of the present invention estimates a going-out time using various sensors provided in the information terminal 10, the going-out time being obtained by the information terminal 10 in the sixth embodiment by making a user consciously operate the touch panel unit 11.

The information terminal 10 automatically detects a user going out, by using various sensors provided in the information terminal 10. The information terminal 10 calculates the boundary time by using a time when the detection was performed as a going-out time.

Examples of a method of detecting a user going out includes a method of detecting a change in position information obtained using a GPS sensor, the change being such that a position indicated by the position information is located away from the position of the house of the user by at least a predetermined distance.

As a sensor for detecting a user going out, an acceleration sensor may be used. In this case, a time when the acceleration sensor detects a travel distance that exceeds a predetermined threshold in the morning is used as the going-out time.

A time when an illuminance sensor detects the illuminance exceeding a predetermined threshold may be used as the going-out time.

Other methods may be used as long as a going-out time can be obtained by using a sensor other than a GPS sensor, an acceleration sensor, and an illuminance sensor described above.

Note that various sensors may be included in the information terminal 10, or may be separately provided outside the information terminal 10. In the case where various sensors are provided outside the information terminal 10, the information terminal 10 may obtain information sensed by the various sensors via the data communication unit 13.

Eighth Embodiment

The information terminal 10 in the eighth embodiment measures the body temperature of a user during sleep, and writes a time when the body temperature of the user bottoms out as the boundary time 737 in the sleep time information 73.

Examples of a method of measuring a body temperature include a method in which the information terminal 10 includes a thermometer that can measure the temperature at a remote point and measures the body temperature of a user while the user is sleeping. Here, the thermometer may be oriented in the direction of the user. As a thermometer that can measure the temperature at a remote point, an infrared thermometer is well known.

A temperature measuring terminal that is closely attached to a user and measures the body temperature of the user may be separately provided outside the information terminal 10. In this case, the information terminal 10 may obtain temporal changes in the body temperature of the user from the temperature measuring terminal over the network 4.

Ninth Embodiment

FIGS. 25A to 25D illustrate operations to be performed by a user in order to change preset temperatures in the information terminal 10 in the ninth embodiment, in chronological order. In FIGS. 25A to 25D, a constituent element similar to that in FIGS. 7, 8A to 8D, and 21A to 21C is given the same reference numeral and description thereof will be omitted.

In the third embodiment, temperatures in the first temperature setting segment 311 and temperatures in the second temperature setting segment 312 are set using curves each having a single inflection point. In the ninth embodiment, a plurality of inflection points are set on each of the curves.

Figure 25A:
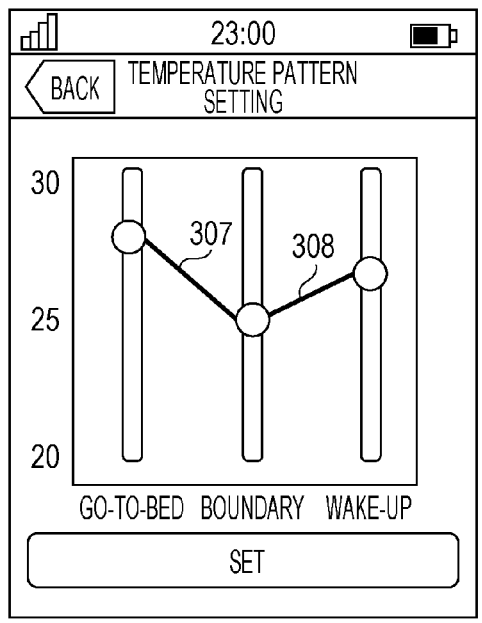
FIG. 25A is a diagram illustrating an example of operations for setting a segment-by-segment preset temperature in a ninth embodiment.
Figure 25B:
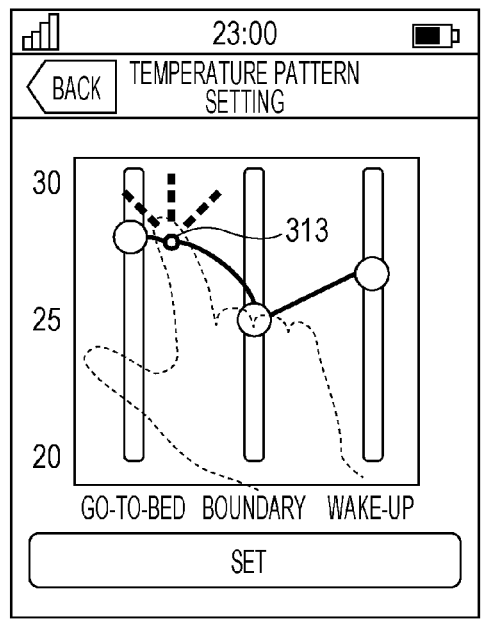
FIG. 25B is a diagram illustrating an example of operations for setting a segment-by-segment preset temperature in the ninth embodiment.

FIG. 25B illustrates a state where, when a user taps the first line 307, an inflection point 313 is set on the first line 307 at a position that the user has tapped.

At this time, the first line 307 changes to a curve that connects a point corresponding to a preset temperature at the go-to-bed time with a point corresponding to a preset temperature at the boundary time and passes through the inflection point 313 that the user has tapped.

Figure 25C:
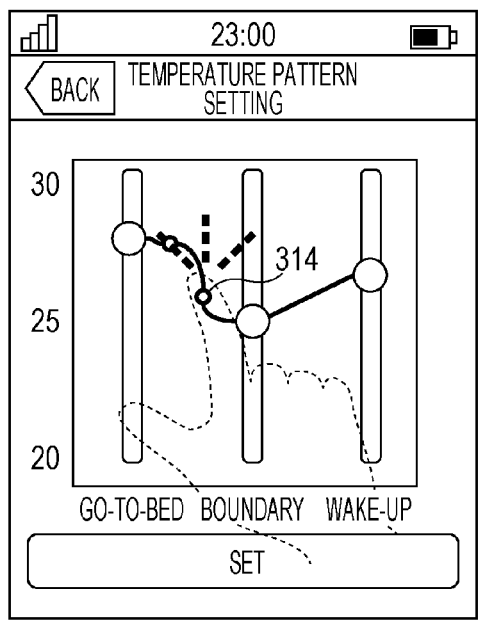
FIG. 25C is a diagram illustrating an example of operations for setting a segment-by-segment preset temperature in the ninth embodiment.

FIG. 25C illustrates a state where, when a user taps the first line 307, a second inflection point 314 is set on the first line 307.

At this time, the first line 307 changes to a curve that connects the point corresponding to the preset temperature at the go-to-bed time with the point corresponding to the preset temperature at the boundary time and passes through the above-described inflection point 313 and the second inflection point 314.

Figure 25D:
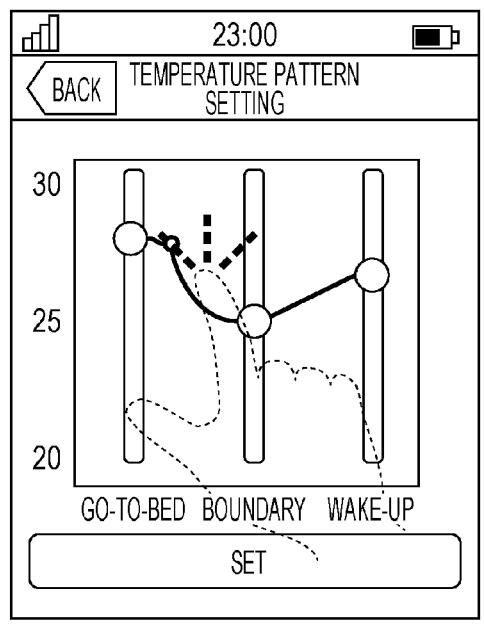
FIG. 25D is a diagram illustrating an example of operations for setting a segment-by-segment preset temperature in the ninth embodiment.

FIG. 25D is a diagram that illustrates a case where the second inflection point 314 that has been once set is cancelled by tapping the second inflection point 314 again.

On the second line 308, operations similar to those for the first line 307 can be performed so as to add or delete an inflection point on the second line 308.

Note that the number of inflection points is not limited to one or two.

With the information terminal 10 in the ninth embodiment, it is possible to set a plurality of inflection points on a curve in the setting screen. As a result, finer temperature setting of the air conditioner is performed and therefore the information terminal 10 can provide a more comfortable indoor environment.

Tenth Embodiment

FIGS. 26A to 26D illustrate operations to be performed by a user in order to change preset temperatures in the information terminal 10 in the tenth embodiment, in chronological order. In FIGS. 26A to 26D, a constituent element similar to that in FIGS. 7 and 8A to 8D is given the same reference numeral and description thereof will be omitted.

In the first embodiment, preset temperatures in the first temperature setting segment 311 are interpolated using the first line 307. In the tenth embodiment, a user can set a preset temperature at a specific relative elapsed time in the first temperature setting segment 311 by explicitly specifying a point.

Figure 26A:
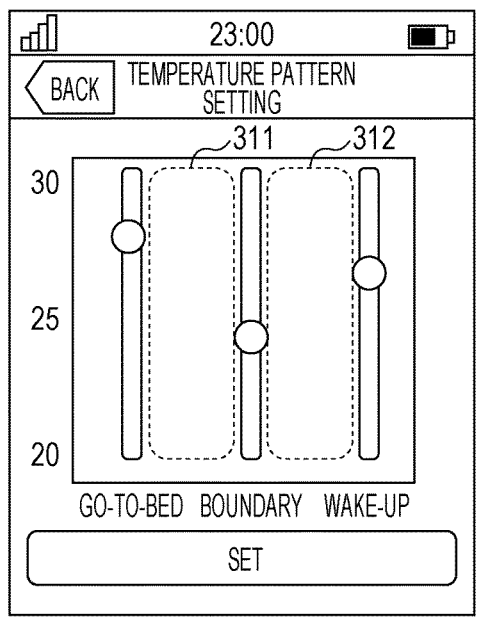
FIG. 26A is a diagram illustrating an example of operations for setting a segment-by-segment preset temperature in a tenth embodiment.

FIG. 26A illustrates an example of a screen displayed by the segment-by-segment preset temperature setting unit 54.

Figure 26B:
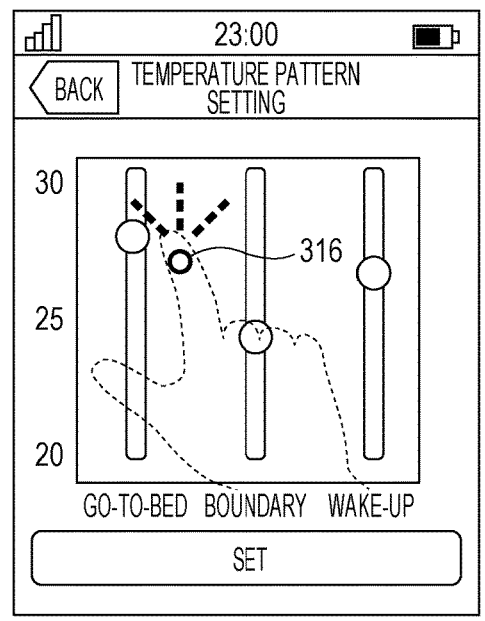
FIG. 26B is a diagram illustrating an example of operations for setting a segment-by-segment preset temperature in the tenth embodiment.

FIG. 26B illustrates a state where, when a user taps a certain point in the first temperature setting segment 311, a point 316 that indicates a preset temperature corresponding to the tapped position is set in the first temperature setting segment 311.

Figure 26C:
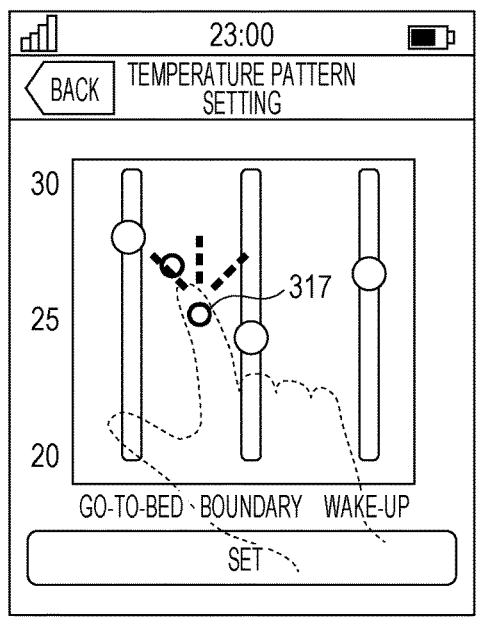
FIG. 26C is a diagram illustrating an example of operations for setting a segment-by-segment preset temperature in the tenth embodiment.

FIG. 26C illustrates a state where, when a user taps a different point in the first temperature setting segment 311, a second point 317 that indicates a preset temperature corresponding to the tapped position is set in the first temperature setting segment 311.

Figure 26D:
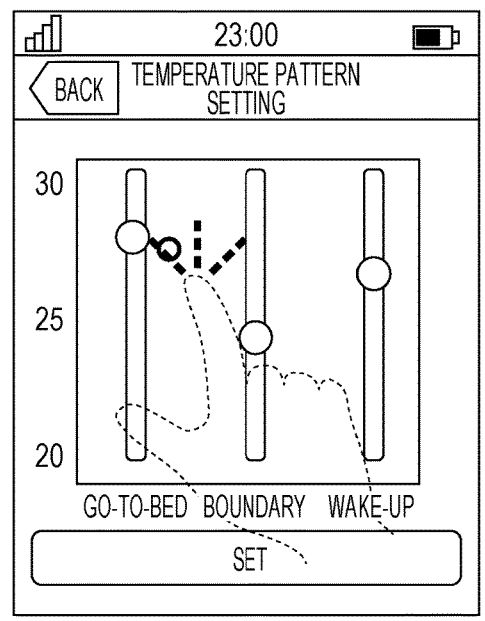
FIG. 26D is a diagram illustrating an example of operations for setting a segment-by-segment preset temperature in the tenth embodiment.
Figure 28A:
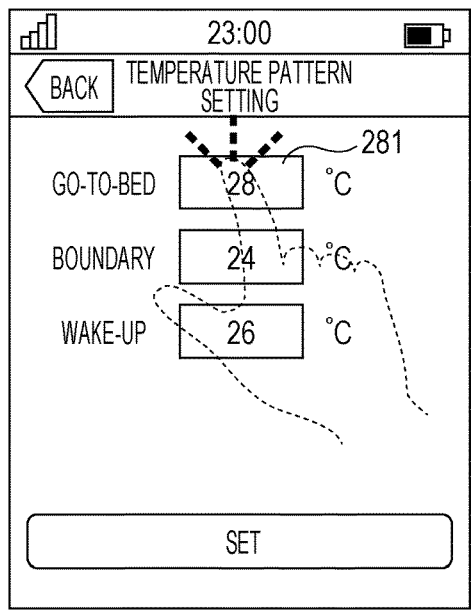
FIG. 28A is a diagram illustrating another example of operations for setting a segment-by-segment preset temperature in the first embodiment.
Figure 28B:
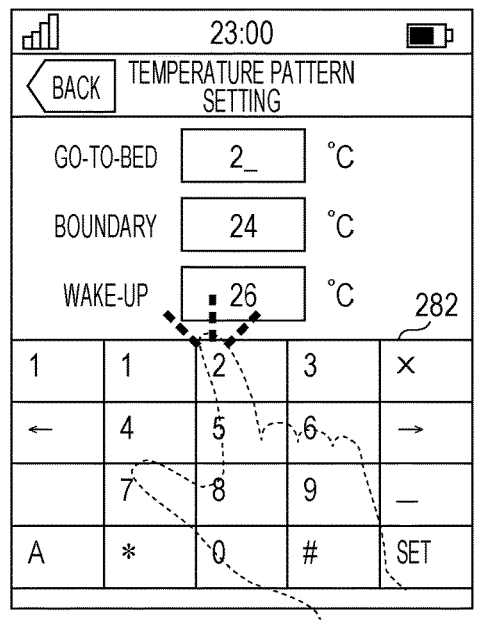
FIG. 28B is a diagram illustrating another example of operations for setting a segment-by-segment preset temperature in the first embodiment.
Figure 28C:
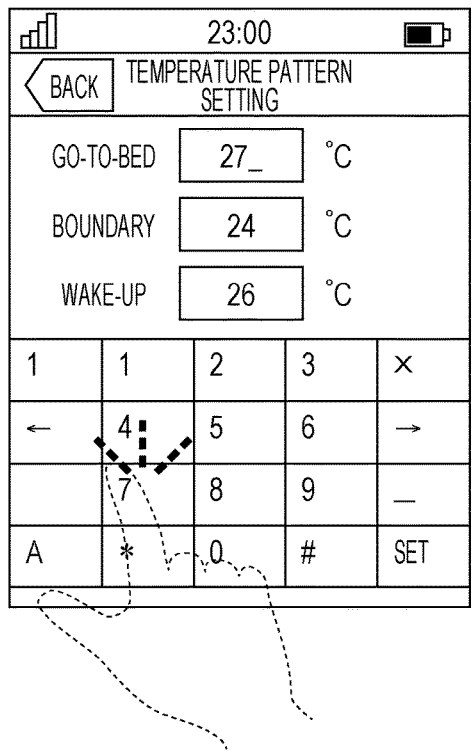
FIG. 28C is a diagram illustrating another example of operations for setting a segment-by-segment preset temperature in the first embodiment.
Figure 28D:
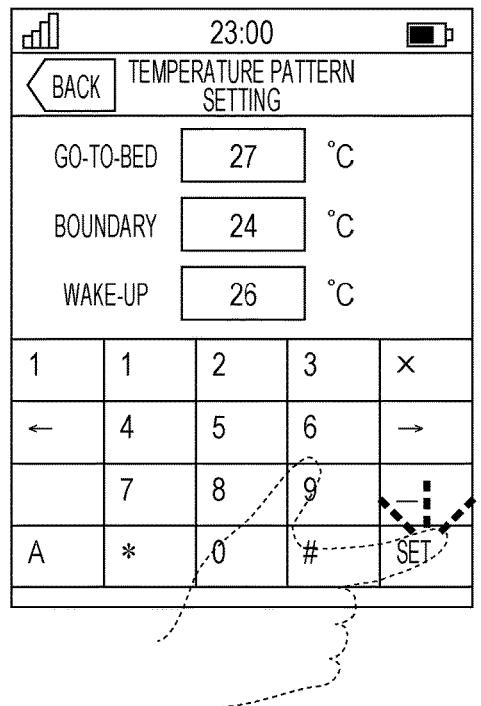
FIG. 28D is a diagram illustrating another example of operations for setting a segment-by-segment preset temperature in the first embodiment.

FIG. 26D illustrates a state where the second point 317 that has been once set is cancelled by a user tapping the second point 317 again.

When a user taps the set button in FIG. 26C, the preset temperatures are fixed and are written in the first temperature setting segment preset temperature information 725 included in the segment-by-segment preset temperature information 72.

FIG. 27A illustrates an example of the first temperature setting segment preset temperature information 725 that has been set by operations performed by a user on the setting screen displayed by the segment-by-segment preset temperature setting unit 54. FIG. 27A illustrates a case where a user has set two points that indicate preset temperatures in the first temperature setting segment 311 by tap operations. The first temperature setting segment preset temperature information 725 includes predetermined time 721 and temperature 722 corresponding to the predetermined time 721.

FIG. 27B illustrates an example of the first time period preset temperature information 745 determined by the air conditioning control information determination unit 57 using the first temperature setting segment preset temperature information 725. For example, it is assumed that the go-to-bed time is 23:00 and the boundary time is 4:00. Here, the first temperature setting segment corresponds to the first time period.

The air conditioning control information determination unit 57 writes the values in the first temperature setting segment preset temperature information 725 in a time period between 23:00, which is the go-to-bed time, and 4 a.m., which is the boundary time, in the first time period preset temperature information 745.

The air conditioning control information determination unit 57 splits the time period from 23:00 to 4 a.m. into equal time intervals of 1 hour and 40 minutes, and writes the preset temperatures corresponding to the respective points in time in order.

Regarding the second temperature setting segment 312, operations are similar to those performed for temperature setting in the first temperature setting segment 311. When a user taps a certain point in the second temperature setting segment 312, the user can add or delete the point that indicates a preset temperature.

The number of points that indicate preset temperatures which are set by tapping is not limited to one or two.

In the setting screen of the information terminal 10 in the tenth embodiment, it is possible to set one or more points that indicate preset temperatures on the curve. As a result, finer temperature setting can be performed and therefore the information terminal 10 can provide a more comfortable air conditioning control to a user.

INDUSTRIAL APPLICABILITY

The present disclosure is useful as a control method for an information terminal that controls an air conditioner over a network.

What is claimed is:

1. A control method for an information terminal device that has a display and controls an air conditioner over a network,
the control method making the information terminal device perform processing comprising:
displaying on the display a temperature setting screen in which a temperature of the air conditioner is settable for each of a plurality of time periods,
the temperature setting screen including a first temperature setting segment used to set a temperature of the air conditioner in a first time period and a second temperature setting segment used to set a temperature of the air conditioner in a second time period, the first time period being a time period from a go-to-bed time of a user using the air conditioner until a first time that is a time between the go-to-bed time and a wake-up time of the user, the second time period being a time period from the first time until the wake-up time;
calculating a first time period preset temperature of the air conditioner which changes in the first time period by using a first preset temperature that is a temperature of the air conditioner at the first time and that is set in the temperature setting screen and a second preset temperature that is a temperature of the air conditioner at the go-to-bed time and that is set in the temperature setting screen;
calculating a second time period preset temperature of the air conditioner which changes in the second time period by using the first preset temperature and a third preset temperature that is a temperature of the air conditioner at the wake-up time and that is set in the temperature setting screen;
displaying in the first temperature setting segment the calculated first time period preset temperature;
displaying in the second temperature setting segment the calculated second time period preset temperature; and
outputting to the network a first control command that corresponds to the first preset temperature and a second control command that corresponds to the second preset temperature in a case where the calculated first time period preset temperature is fixed as the first time period preset temperature and the calculated second time period preset temperature is fixed as the second time period preset temperature.

2. The control method according to claim 1, wherein
the calculated first time period preset temperature is represented by a first line that connects a point corresponding to the second preset temperature and a point corresponding to the first preset temperature, and
the calculated second time period preset temperature is represented by a second line that connects a point corresponding to the third preset temperature and the point corresponding to the first preset temperature.

3. The control method according to claim 2, wherein
the display is a touch panel display,
the first line is changeable to a curve by an operation performed by a user who has touched the first line, and
the second line is changeable to a curve by an operation performed by the user who has touched the second line.

4. The control method according to claim 2, wherein
the first line is a straight line and the second line is a straight line.

5. The control method according to claim 1, wherein
the calculated first time period preset temperature is represented using a graph having a vertical axis that represents a preset temperature of the air conditioner and a horizontal axis that represents time, and
the calculated second time period preset temperature is represented using a graph having a vertical axis that represents a preset temperature of the air conditioner and a horizontal axis that represents time.

6. The control method according to claim 1, wherein
the first control command and the second control command are outputted to the network at a predetermined timing.

7. The control method according to claim 1, wherein
the first time is a time between 3:30 a.m. and 4:30 a.m.

8. The control method according to claim 1, the processing further comprising:
displaying on the display a time setting screen for setting a going-out time that is a time when the user goes out, separately from the temperature setting screen, wherein
the first time is a time obtained by subtracting a first predetermined time from the going-out time that is set in the time setting screen.

9. The control method according to claim 8, wherein
the first predetermined time is a time having a range of two hours to three hours.

10. The control method according to claim 1, wherein
the information terminal device is connected to a system that manages position information indicating a position of the information terminal device, receives, from the system, information indicating that the information terminal device is located away from a house of a user of the information terminal device by a predetermined distance for the first time after the wake-up time, and sets a time obtained by subtracting a second predetermined time from a time when receiving the information as the first time.

11. The control method according to claim 10, wherein
the second predetermined time is a time having a range of two hours to three hours.

12. The control method according to claim 1, wherein
the information terminal device includes a thermometer, and
sets a time when a body temperature of the user measured by the thermometer bottoms out as the first time.

13. The control method according to claim 1, wherein
the go-to-bed time is a time when the calculated first time period preset temperature is fixed as the first time period preset temperature and the calculated second time period preset temperature is fixed as the second time period preset temperature.

14. The control method according to claim 1, wherein
the information terminal device includes an illuminance sensor, and
sets a time when the illuminance sensor detected turn-off of a light in space where the user sleeps as the go-to-bed time.

15. The control method according to claim 1, wherein
the information terminal device includes an alarm, and
sets a time which is set by the user and at which the alarm is activated as the wake-up time.

16. A non-transitory computer readable medium storing a program executed by an information terminal device that has a display and controls an air conditioner over a network,
the program causing a computer of the information terminal device to execute processing comprising:
displaying on the display a temperature setting screen in which a temperature of the air conditioner is settable for each of a plurality of time periods,
the temperature setting screen including a first temperature setting segment used to set a temperature of the air conditioner in a first time period and a second temperature setting segment used to set a temperature of the air conditioner in a second time period, the first time period being a time period from a go-to-bed time of a user using the air conditioner until a first time that is a time between the go-to-bed time and a wake-up time of the user, the second time period being a time period from the first time until the wake-up time;
calculating a first time period preset temperature of the air conditioner which changes in the first time period by using a first preset temperature that is a temperature of the air conditioner at the first time and that is set in the temperature setting screen and a second preset temperature that is a temperature of the air conditioner at the go-to-bed time and that is set in the temperature setting screen;
calculating a second time period preset temperature of the air conditioner which changes in the second time period by using the first preset temperature and a third preset temperature that is a temperature of the air conditioner at the wake-up time and that is set in the temperature setting screen;
displaying in the first temperature setting segment the calculated first time period preset temperature;
displaying in the second temperature setting segment the calculated second time period preset temperature; and
outputting to the network a first control command that corresponds to the first preset temperature and a second control command that corresponds to the second preset temperature in a case where the calculated first time period preset temperature is fixed as the first time period preset temperature and the calculated second time period preset temperature is fixed as the second time period preset temperature.

\* \* \* \* \*